(12) United States Patent
Hwang et al.

(10) Patent No.: US 12,476,730 B2
(45) Date of Patent: Nov. 18, 2025

(54) METHOD AND APPARATUS FOR PERFORMING SIGNAL COMPENSATION BASED ON FREQUENCY RESOURCE ALLOCATION

(71) Applicant: Samsung Electronics Co., Ltd., Suwon-si (KR)

(72) Inventors: Byeonghun Hwang, Suwon-si (KR); Bongsung Seo, Suwon-si (KR); Suhwook Kim, Suwon-si (KR); Seungil Park, Suwon-si (KR); Hyeondeok Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 358 days.

(21) Appl. No.: 18/312,271

(22) Filed: May 4, 2023

(65) Prior Publication Data

US 2024/0305402 A1 Sep. 12, 2024

(30) Foreign Application Priority Data

Mar. 6, 2023 (KR) .................. 10-2023-0029389

(51) Int. Cl.
*H04L 1/00* (2006.01)
*H04L 5/00* (2006.01)
(52) U.S. Cl.
CPC .......... *H04L 1/0007* (2013.01); *H04L 5/0051* (2013.01)
(58) Field of Classification Search
CPC ... H04L 1/0007; H04L 5/0051; H04L 5/0048; H04L 25/0254; H04L 25/03;
(Continued)

(56) References Cited

U.S. PATENT DOCUMENTS

| 10,581,469 B1 | 3/2020 | O'Shea et al. |
| 2019/0363742 A1 | 11/2019 | Megretski et al. |

(Continued)

FOREIGN PATENT DOCUMENTS

| CN | 112804718 A | 5/2021 |
| JP | 3684377 B2 | 3/2003 |

(Continued)

OTHER PUBLICATIONS

Perfomance evaluation of a novel WLAN receiver performance in highly disperse nonlinear environment by Kulat et al. (Year: 2012).*

(Continued)

*Primary Examiner* — Dady Chery
(74) *Attorney, Agent, or Firm* — Jefferson IP Law, LLP

(57) ABSTRACT

The disclosure relates to a $5^{th}$ generation (5G) communication system or a $6^{th}$ generation (6G) communication system for supporting higher data rates beyond a $4^{th}$ generation (4G) communication system, such as long term evolution (LTE). A method performed by a receiving node in a wireless communication system is provided. The method includes receiving first signals from a transmitting node, identifying compensation values in which distortion of the first signals is compensated on a time domain by using an artificial neural network trained by a designated scheme, and obtaining second signals of which the distortion is compensated based on the identified compensation values. The designated scheme may be determined by a size of a first resource block (RB) assigned to receive the first signals from the transmitting node.

20 Claims, 18 Drawing Sheets

(58) Field of Classification Search
CPC .............. H04L 27/26526; H03F 3/195; H03F 2200/294; H03F 2200/451; H03F 1/32; G06N 3/04; G06N 20/00; H04B 1/62
See application file for complete search history.

(56) References Cited

U.S. PATENT DOCUMENTS

| | | |
|---|---|---|
| 2021/0266875 A1 | 8/2021 | Namgoong et al. |
| 2022/0052885 A1* | 2/2022 | Luo .................... H04L 25/0254 |
| 2022/0085951 A1* | 3/2022 | Lee .................... B60W 60/0053 |
| 2022/0210555 A1* | 6/2022 | Ru ......................... H04R 3/002 |
| 2023/0006877 A1 | 1/2023 | Chen et al. |
| 2023/0021633 A1 | 1/2023 | Li et al. |
| 2025/0112652 A1* | 4/2025 | Farhadi .................. H04B 17/14 |

FOREIGN PATENT DOCUMENTS

| | | |
|---|---|---|
| KR | 10-2021-0091669 A | 7/2021 |
| WO | 2022/229046 A1 | 11/2022 |
| WO | 2022/253400 A1 | 12/2022 |

OTHER PUBLICATIONS

International Search Report dated Nov. 21, 2023, issued in International Patent Application No. PCT/KR2023/00617.

* cited by examiner

METHOD AND APPARATUS FOR PERFORMING SIGNAL COMPENSATION BASED ON FREQUENCY RESOURCE ALLOCATION

CROSS-REFERENCE TO RELATED APPLICATION(S)

This application is based on and claims priority under 35 U.S.C. § 119(a) of a Korean patent application number 10-2023-0029389, filed on Mar. 6, 2023, in the Korean Intellectual Property Office, the disclosure of which is incorporated by reference herein in its entirety.

BACKGROUND

1. Field

The disclosure relates to a wireless communication system (or a mobile communication system). More particularly, the disclosure relates to a method and apparatus for performing signal compensation, based on frequency resource allocation.

2. Description of Related Art

Considering the development of wireless communication from generation to generation, the technologies have been developed mainly for services targeting humans, such as voice calls, multimedia services, and data services. Following the commercialization of $5^{th}$ generation (5G) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6th generation (6G) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bit per second (bps) and a radio latency less than 100 μsec, and thus will be 50 times as fast as 5G communication systems and have the ¹/₁₀ radio latency thereof.

In order to accomplish such a high data rate and an ultra-low latency, it has been considered to implement 6G communication systems in a terahertz (THz) band (for example, 95 gigahertz (GHz) to 3 THz bands). It is expected that, due to severer path loss and atmospheric absorption in the terahertz bands than those in millimeter wave (mm-Wave) bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple-input multiple-output (MIMO), full dimensional MIMO (FD-MIMO), array antennas, and multiantenna transmission technologies, such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems, a full-duplex technology for enabling an uplink transmission and a downlink transmission to simultaneously use the same frequency resource at the same time, a network technology for utilizing satellites, high-altitude platform stations (HAPS), and the like in an integrated manner, an improved network structure for supporting mobile base stations and the like and enabling network operation optimization and automation and the like, a dynamic spectrum sharing technology via collision avoidance based on a prediction of spectrum usage, an use of artificial intelligence (AI) in wireless communication for improvement of overall network operation by utilizing AI from a designing phase for developing 6G and internalizing end-to-end AI support functions, and a next-generation distributed computing technology for overcoming the limit of user equipment (UE) computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. More particularly, it is expected that services, such as truly immersive extended reality (XR), high-fidelity mobile hologram, and digital replica could be provided through 6G communication systems. In addition, services, such as remote surgery for security and reliability enhancement, industrial automation, and emergency response will be provided through the 6G communication system such that the technologies could be applied in various fields, such as industry, medical care, automobiles, and home appliances.

The above information is presented as background information only to assist with an understanding of the disclosure. No determination has been made, and no assertion is made, as to whether any of the above might be applicable as prior art with regard to the disclosure.

SUMMARY

Nonlinearity of a power amplifier of a transmitting node may result in distortion of a signal received by a receiving node, compared to a signal output from the transmitting node. Even if digital pre-distortion (DPD) is performed to reduce the distortion of the received signal, the distortion caused by the nonlinearity of the power amplifier may still exist.

In addition, although the receiving node may use an artificial neural network of artificial intelligence (AI) to identify a compensation value in which distortion is compensated, there may be a problem in that reliability of the compensation value deteriorates depending on a size of a resource block (RB) utilized to train the artificial neural network. For example, in case that the RB has a small size, there may be an issue in that the artificial neural network overfits to a size of a specific RB. In addition, as another example, in case that the RB has a large size, there may be an issue in that a lot of time and computation resources are consumed to train the artificial neural network.

Aspects of the disclosure are to address at least the above-mentioned problems and/or disadvantages and to provide at least the advantages described below. Accordingly, an aspect of the disclosure is to provide a method and apparatus for performing signal compensation, based on frequency resource allocation.

Additional aspects will be set forth in part in the description which follows and, in part, will be apparent from the description, or may be learned by practice of the presented embodiments.

In accordance with an aspect of the disclosure, a method performed by a receiving node in a wireless communication system is provided. The method includes receiving first signals from a transmitting node, identifying compensation values in which distortion of the first signals is compensated on a time domain by using an artificial neural network trained by a designated scheme, and obtaining second signals of which the distortion is compensated based on the identified compensation values. The designated scheme may be determined by a size of a first resource block (RB) assigned to receive the first signals from the transmitting node.

In accordance with another aspect of the disclosure, a receiving node in a wireless communication system is provided. The receiving node includes a transceiver, and at least one processor coupled with the transceiver. The at least one processor may be configured to receive first signals from a transmitting node, identify compensation values in which distortion of the first signals is compensated on a time domain by using an artificial neural network trained by a designated scheme, and obtain second signals of which the distortion is compensated based on the identified compensation values. The designated scheme may be determined by a size of a first resource block (RB) assigned to receive the first signals from the transmitting node.

According to an embodiment, a receiving node may use an artificial neural network to increase reliability of a compensation value in which signal distortion is compensated due to nonlinearity.

According to an embodiment, the receiving node may reduce a case where the artificial neural network overfits to a size of a specific RB depending on an RB size, or may reduce or minimize a case where the artificial neural network unnecessarily consumes a time and computing resources.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known Functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
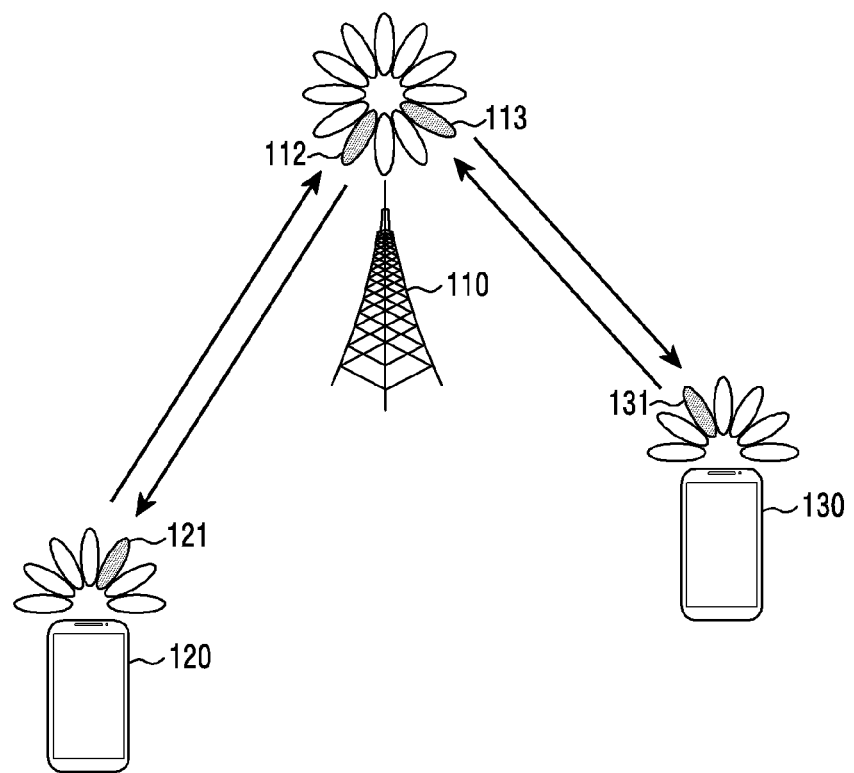
FIG. 1 illustrates a wireless communication system according to an embodiment of the disclosure.

FIG. 1 illustrates a wireless communication system according to an embodiment of the disclosure.

Referring to FIG. 1, as part of nodes which use a radio channel in the wireless communication system, a base station 110, a first terminal 120, and/or a second terminal 130 are exemplified in FIG. 1. Although only one base station is illustrated in FIG. 1, this is only an example. Other base stations identical or similar to the base station 110 may be further included in the wireless communication system of FIG. 1.

The base station 110 is a network infrastructure which provides a radio access to the terminals 120 and 130. The base station 110 has a coverage defined as a specific geographic region, based on a distance capable of transmitting a signal. In addition to the term 'base station', the base station 110 may be referred to as an 'access point (AP)', an 'eNodeB (eNB)', a 'gNodeB (gNB)', a '5$^{th}$ generation (5G) node', a 'wireless point', a 'transmission/reception point (TRP)', or other terms having equivalent technical meanings.

As a device used by a user, each of the first terminal 120 and the second terminal 130 may communicate with the base station 110 through the radio channel. At least one of the first terminal 120 and the second terminal 130 may be operated without user involvement. For example, at least one of the first terminal 120 and the second terminal 130 may be a device for performing machine type communication (MTC), and may not be carried by the user. In addition to the term 'terminal', each of the first terminal 120 and the second terminal 130 may be referred to as a 'user equipment (UE)', a 'mobile station', a 'subscriber station', a 'customer premises equipment (CPE)', a 'remote terminal', a 'wireless terminal', an 'electronic device', a 'user device', or other terms having equivalent technical meanings.

The base station 110, the first terminal 120, and the second terminal 130 may transmit and/or receive a radio signal at a millimeter Wave (mmWave) band (e.g., 28 GHz, 30 GHz, 38 GHz, 60 GHz)). In this case, to improve a channel gain, the base station 110, the first terminal 120, and the second terminal 130 may perform beamforming.

The beamforming may include transmission beamforming and/or reception beamforming. For example, the base station 110, the first terminal 120, and the second terminal 130 may assign a directivity to a transmission signal and or a reception signal. To assign the directivity to the reception signal, the base station 110 and/or the terminals 120 and 130 may select serving beams 112, 113, 121, and 131 through a beam search or beam management procedure. After the serving beams 112, 113, 121, and 131 are selected, subsequent communication may be performed through a resource having a quasi co-located (QCL) relation with a resource used to transmit the serving beams 112, 113, 121, and 131.

Each of the base station 110, first terminal 120, and second terminal 130 of the disclosure may be a transmitting apparatus, a transmitting node, a receiving apparatus, and/or a receiving node. For example, the base station 110 may transmit a radio frequency (RF) signal to the first terminal 120. The base station 110 may receive the RF signal from the first terminal 120. As another example, the first terminal 120 may transmit the RF signal to the base station 110 or the second terminal 130. The first terminal 120 may receive the RF signal from the base station 110 or the second terminal 130.

Figure 2:
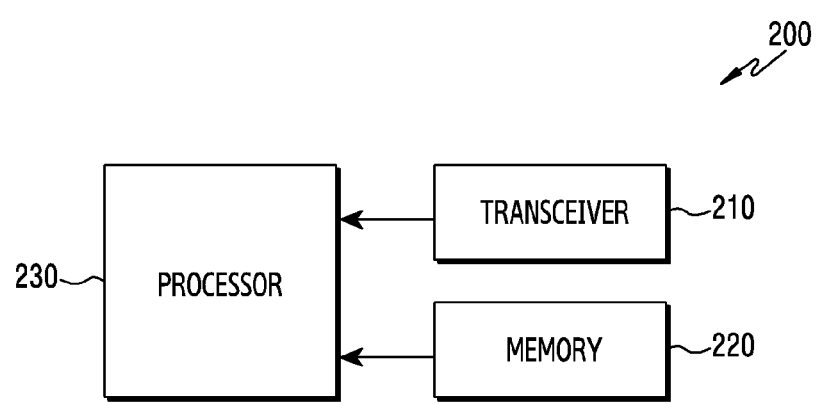
FIG. 2 is a diagram illustrating a structure of a terminal according to an embodiment of the disclosure.

FIG. 2 is a diagram for illustrating a structure of a terminal according to an embodiment of the disclosure.

Referring to FIG. 2, a terminal 200 according to an embodiment may include a transceiver 210, a memory 220, and/or a processor 230. Although it is described in the disclosure that the terminal 200 includes the transceiver 210, the memory 220, and/or the processor 230, this is only an example. For example, the terminal 200 may further include other components in addition to the transceiver 210, the memory 220, and/or the processor 230.

According to an embodiment, each of the transceiver 210, the memory 220, and the processor 230 may be implemented or constructed as a separate chip. However, this is only an example, and the transceiver 210, the memory 220, and/or the processor 230 may be implemented or constructed as a single chip.

According to an embodiment, the transceiver 210 may include at least one transmitter and/or at least one receiver. For example, the transceiver 210 may include an RF transmitter for amplifying and up-converting a frequency of a transmitted signal. The transceiver 210 may include an RF receiver for down-converting a frequency of a received signal and amplifying low-noise, Components of the transceiver 210 described in the disclosure are only an example, and the component of the transceiver 210 is not limited to the RF transmitter and the RF receiver. For example, the transceiver 210 may further include a coupler for securing isolation between the RF transmitter and the RF receiver.

According to an embodiment, the transceiver 210 may transmit or receive a signal to or from the processor 230. For example, the transceiver 210 may transmit or deliver the received RF signal to the processor 230 through a wireless communication channel. The transceiver 210 may obtain the RF signal received or delivered from the processor 230.

According to an embodiment, the transceiver 210 may be referred to as a UE transmitter or a UE receiver.

According to an embodiment, the transceiver 210 may transmit a signal to a base station (e.g., the base station 110 of FIG. 1) or a network entity (e.g., a user plane function (UPF) entity) or may receive a signal from the base station or the network entity. In an embodiment, the signal to be transmitted or received may include a control signal or data.

According to an embodiment, the memory 220 may include or store a program or data required in operations of the terminal 200. For example, the memory 220 may be a non-transitory memory, and a program stored in the non-transitory memory may be organically combined with a hardware component (e.g., the processor 230 or the transceiver 210) of the terminal 200. The memory 220 may store control information or data including a signal obtained by the terminal 200. In an embodiment, the memory 220 may include a read-only memory (ROM), a random access memory (RAM), a hard disk, a compact disc read only memory (CD-ROM), a digital versatile disc (DVD), and/or storage media.

According to an embodiment, the processor 230 may include one processor or a plurality of processors. For example, the processor 230 may include a communication processor. For example, the processor 230 may include the communication processor and/or an application processor.

According to an embodiment, the processor 230 may control a series of processes performed by the terminal 200. For example, the transceiver 210 may receive a data signal including control information transmitted by the base station or the network entity. The processor 230 may process the received control signal and data signal.

The term 'processor' of the disclosure may be replaced with various terms referring to a component executing or performing operations of the terminal 200. For example, the processor may be replaced with a controller or a computing circuit.

The terminal 200 of the disclosure may correspond to the first terminal 120 and/or second terminal 130 of FIG. 1.

Figure 3:
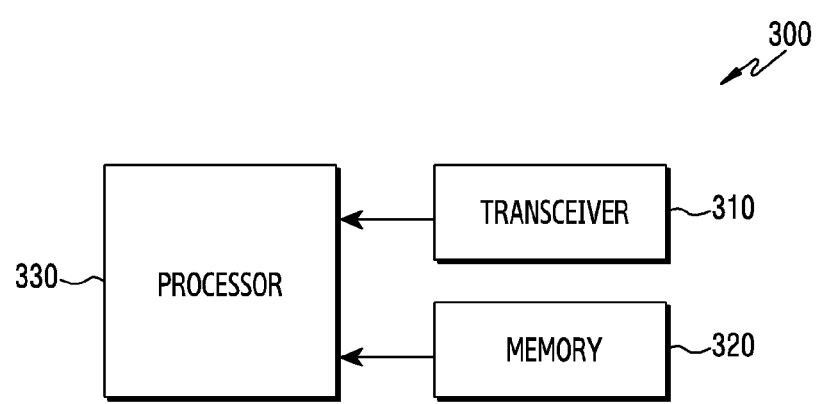
FIG. 3 is a diagram illustrating a structure of a base station according to an embodiment of the disclosure.

FIG. 3 is a diagram for illustrating a structure of a base station according to an embodiment of the disclosure.

Referring to FIG. 3, a base station 300 according to an embodiment may include a transceiver 310, a memory 320, and/or a processor 330. Although it is described in the disclosure that the base station 300 includes the transceiver 310, the memory 320, and/or the processor 330, this is only an example. For example, the base station 300 may further include other components in addition to the transceiver 310, the memory 320, and/or the processor 330.

According to an embodiment, each of the transceiver 310, the memory 320, and the processor 330 may be implemented or constructed as a separate chip. However, this is only an example, and the transceiver 310, the memory 320, and/or the processor 330 may be implemented or constructed as a single chip.

According to an embodiment, the transceiver 310 may include at least one transmitter and/or at least one receiver. For example, the transceiver 310 may include an RF transmitter for amplifying and up-converting a frequency of a transmitted signal. The transceiver 310 may include an RF receiver for down-converting a frequency of a received signal and amplifying low-noise, Components of the transceiver 310 described in the disclosure are only an example, and the component of the transceiver 310 is not limited to the RF transmitter and the RF receiver. For example, the transceiver 310 may further include a coupler for securing isolation between the RF transmitter and the RF receiver.

According to an embodiment, the transceiver 310 may transmit or receive a signal to or from the processor 330. For example, the transceiver 310 may transmit or deliver the received RF signal to the processor 330 through a wireless communication channel. The transceiver 310 may obtain the RF signal received or delivered from the processor 330.

According to an embodiment, the transceiver 310 may be referred to as a base station transmitter or a base station receiver.

According to an embodiment, the transceiver 310 may transmit a signal to the terminal 200 or may receive a signal from the terminal 200. In an embodiment, the signal to be transmitted or received may include a control signal or data.

According to an embodiment, the memory 320 may include a program or data required in operations of the base station 300. For example, the memory 320 may be a non-transitory memory, and a program stored in the non-transitory memory may be organically combined with a hardware component (e.g., the processor 330 or the transceiver 310) of the base station 300. The memory 320 may store control information or data including a signal obtained by the base station 300. In an embodiment, the memory 320 may include a read-only memory (ROM), a random access memory (RAM), a hard disk, a CD-ROM, a DVD, and/or storage media.

According to an embodiment, the processor 330 may include one processor or a plurality of processors. For example, the processor 330 may include a communication processor. For example, the processor 330 may include the communication processor and/or an application processor.

According to an embodiment, the processor 330 may control a series of processes performed by the base station 300. For example, the transceiver 310 may receive a data signal including control information transmitted by the base station or the network entity. The processor 330 may process the received control signal and data signal.

The term 'processor' of the disclosure may be replaced with various terms referring to a component executing or performing operations of the base station 300. For example, the processor may be replaced with a controller or a computing unit.

Figure 4:
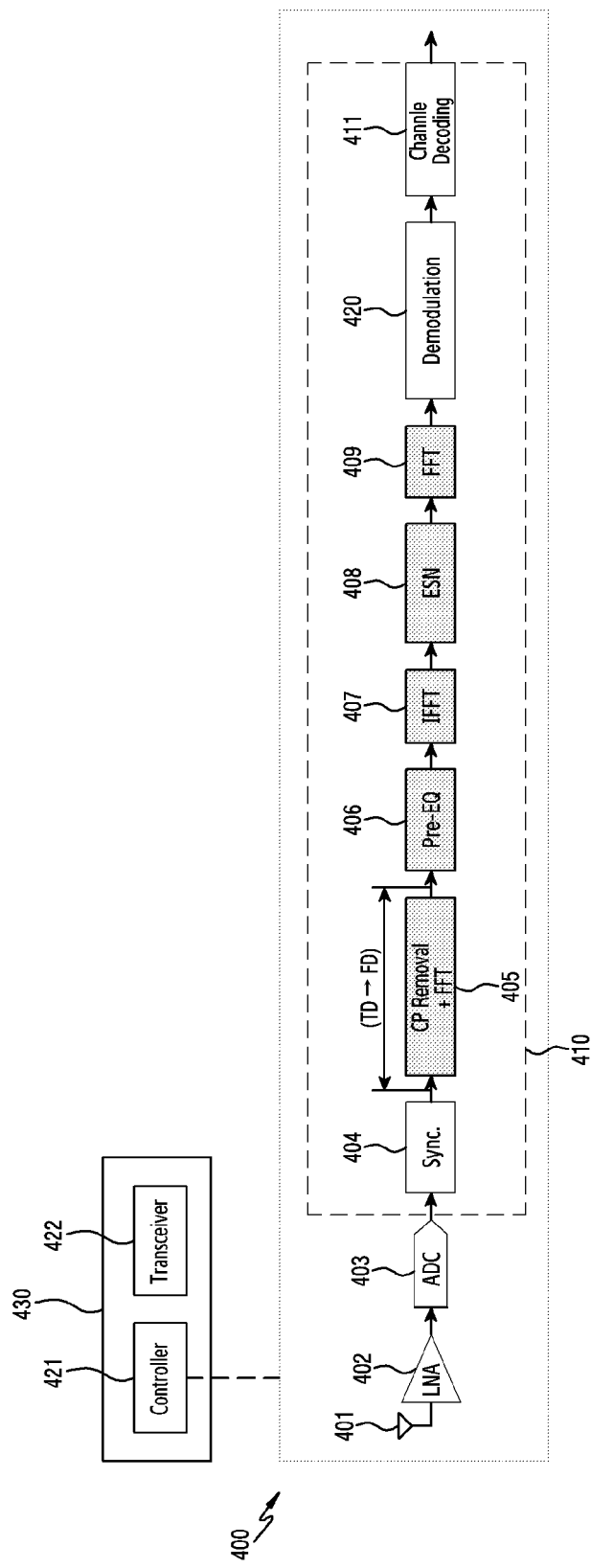
FIG. 4 is a diagram illustrating a receiving node according to an embodiment of the disclosure.

FIG. 4 is a diagram for illustrating a receiving node according to an embodiment of the disclosure.

Referring to FIG. 4, a receiving node 400 according to an embodiment may include at least one antenna 401, a low noise amplifier (LNA) 402 electrically coupled to the at least one antenna 401, an analog digital converter (ADC), and/or a signal processing circuit 410.

According to an embodiment, the signal processing circuit 410 may include a synchronization block 404, a cyclic prefix (CP) removal block 405, a pre-equalizer 406, an inverse fast Fourier transform (IFFT) block 407, an echo state network (ESN) block 408, a fast Fourier transform (FFT) block 409, a demodulation block 420, and/or a channel decoding block 411.

According to an embodiment, the at least one antenna 401 may receive a radio frequency (RF) signal from a transmitting node 430. For example, the transmitting node 430 may include a controller 421 and/or a transceiver 422, and the transmitting node 430 may transmit an RF signal to the receiving node 400 through the transceiver 422 under the control of the controller 421. The at least one antenna 401 may receive the RF signal transmitted from the transmitting node 430.

According to an embodiment, the at least one antenna 401 may include various types of antennas. For example, the at least one antenna 401 may include patch antennas for transmitting and/or receiving a signal of a mmWave frequency band (e.g., an FR2 frequency band). For example, the at least one antenna 401 may include an antenna radiator (e.g., a slit antenna, an inverted-F antenna (IFA)) for transmitting and/or receiving a signal of a designated frequency band (e.g., an FR2 frequency band).

According to an embodiment, the LNA 402 may be electrically coupled to the at least one antenna 401, and may amplify an RF signal received from the at least one antenna 401.

According to an embodiment, the ADC 403 may convert an analog signal received by the receiving node 400 to a digital signal, or may convert a digital signal transmitted by the receiving node 400 to an analog signal. For example, the ADC 403 may convert an analog signal amplified by the LNA 402 to a digital signal.

According to an embodiment, the synchronization block 404 may perform synchronization of received signals.

According to an embodiment, the CP removal block 405 may remove a cyclic prefix of a received RF signal. For example, the received RF signal may include a cyclic prefix for avoiding interference, and the CP removal block 405 may remove the cyclic prefix. In an embodiment, the CP removal block 405 may perform FFT on the received RF signal. For example, the CP removal block 405 may convert time-domain data of the received RF signal to frequency-domain data.

According to an embodiment, the pre-equalizer 406 may perform channel equalization. For example, the RF signal transmitted from the transmitting node 430 may be received to the receiving node 400 through a communication channel, and the RF signal may be distorted due to the communication channel. In an example, the pre-equalizer 406 may reduce or minimize the effect of the communication channel by providing control such that high-frequency components which are relatively more affected by the communication channel are to transition more compared to relatively low-frequency components.

According to an embodiment, the IFFT block 407 may perform IFFT on the received RF signal.

According to an embodiment, the ESN block 408 may be referred to as a block for compensating for signal distortion caused by nonlinearity of a power amplifier included in the transceiver 422 of the transmitting node 430. For example, the ESN block 408 may include an artificial neural network (or an artificial intelligence model), and may compensate for distortion of a received RF signal by using the artificial neural network. For example, the ESN block 408 may identify a compensation value for compensating for distortion of the received RF signal by using the artificial neural network, and may adjust, compensate, or calibrate strength of the received RF signal, based on the compensation value.

Hereinafter, a process of training the artificial neural network included in the ESN block 408 will be described below with reference to FIGS. 5 to 10, 11A, 11B, 12A to 12C, 13, 14A, and 14B.

According to an embodiment, the FFT block 409 may perform FFT on an RF signal of which distortion is compensated. For example, in order for the ESN block 408 to compensate for distortion of the RF signal, the IFFT block 407 may need to perform IFFT. For example, in order for the ESN block 408 to compensate for the distortion of the received RF signal, the RF signal needs to be converted from a frequency domain to a time domain. The FFT block 409 may perform FFT again on the RF signal on the time domain on which compensation has been completed by the ESN block 480 and convert the RF signal on the time domain to the frequency domain.

According to an embodiment, the demodulation block 420 may demodulate the RF signal modulated and transmitted from the transmitting node 430. The channel decoding block 411 may perform decoding on a decoded RF signal.

Although the ESN block 403 has been described in the disclosure as a block including the artificial neural network, this is only an example. The ESN block 408 may include various artificial neural networks regardless of the name. For example, the ESN block 408 may include an ESN, a deep neural network (DNN), a convolution neural network (CNN), and/or a recurrent neural network (RNN).

As another example, the ESN block 408 may be replaced with an RNN AI network (e.g., long short-term memory (LSTM), gate recurrent unit (GRU)). For example, the ESN block 408 may be replaced with 2 fully connected layers, and the 2 fully connected layers may include a pre-trained first layer and/or a trainable second layer.

Blocks (e.g., the synchronization block 404) included in the signal processing circuit 410 of the disclosure may correspond to modules corresponding to software. For example, the synchronization block 404 may correspond to a software module implemented or executed in the signal processing circuit 410 which is a hardware component.

The term 'block' in the disclosure may be replaced with a terminal referring to software which performs a designated function. For example, the synchronization block may be replaced with a synchronization module.

Expressions of 'transmitting' and 'receiving' respectively in the receiving node 400 and transmitting node 430 of the disclosure are only for convenience of explanation. For example, the receiving node 400 may perform not only receiving of an RF signal but also transmitting of the RF signal. For example, the transmitting node 430 may perform not only transmitting of the RF signal but also receiving of the RF signal.

Figure 5:
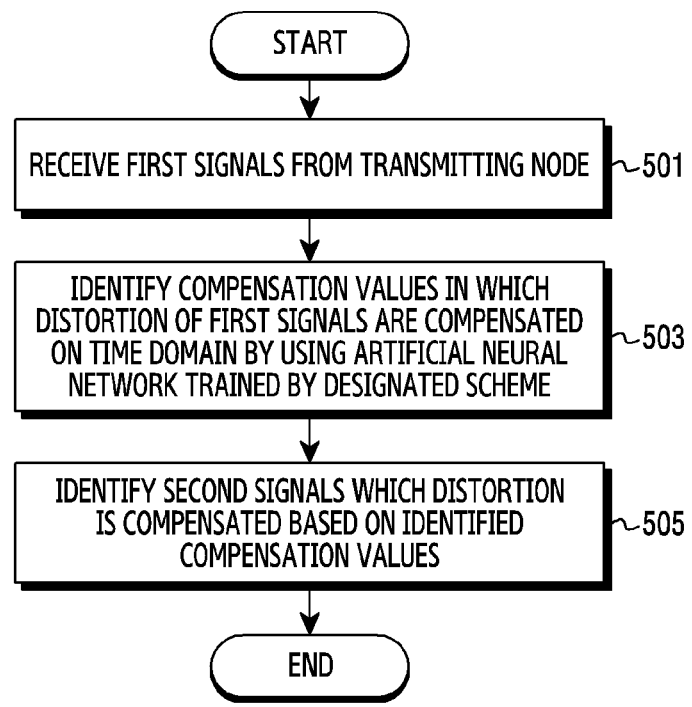
FIG. 5 is a diagram illustrating a method of compensating for strength of a signal distorted by a power amplifier, based on an artificial neural network according to an embodiment of the disclosure.

FIG. 5 is a diagram for illustrating a method of compensating for strength of a signal distorted by a power amplifier, based on an artificial neural network according to an embodiment of the disclosure.

Referring to FIG. 5, in operation 501, the receiving node 400 according to an embodiment may receive first signals from the transmitting node 430. For example, the receiving node 400 corresponding to a base station may receive the first signals from the transmitting node 430 corresponding to a UE. For example, the receiving node 400 corresponding to the UE may receive the first signals from the transmitting node 430 corresponding to the base station. For example, the receiving node 400 corresponding to a first UE may receive the first signals from the transmitting node 430 corresponding a second UE through side link communication.

According to an embodiment, the first signals transmitted by the transmitting node 430 may include at least one data signal including data and/or at least one pre-set reference signal (RS). For example, the pre-set RSs may include channel state information (CSI)-RS for identifying a state of a downlink channel, a sounding reference signal (SRS) for identifying a state of an uplink channel, and/or a demodulation reference signal (DMRS) for estimating a channel value required for demodulation.

According to an embodiment, in operation 503, the receiving node 400 may identify compensation values (or output values of the artificial neural network) in which distortion of the first signals is compensated on a time domain by using the artificial neural network trained by a designated scheme. In an embodiment, the distortion of the first signals may occur in a power amplified included in the transceiver 422 of the transmitting node 430. For example, the distortion of the signals may occur based on nonlinearity of the power amplifier of the transmitting node 430.

According to an embodiment, the designated scheme for training the artificial neural network may be determined based on a size of a first Resource Block (RB) allocated to be received from the transmitting node 430.

For example, in case that the size of the first RB is included in a first section, the artificial neural network may be trained by a first scheme which uses first RSs received in the first RB. For example, in case that the size of the first RB is included in a second section lower than the first section, the artificial neural network may be trained by a second scheme by using the first RSs received based on the first RB and second RSs received based on the first RB. For example, in case that the size of the first RB is included in a third section higher than the first section, the artificial neural network may be trained by a third scheme which uses some of the first RSs received based on the first RB.

For example, in case that the size of the first RB is included in a fourth section lower than the second section, the artificial neural network may not be trained by using the first RSs received in the first RB. For example, in case that the size of the first RB belongs to a specific section, the artificial neural network may not utilize the first RSs received in the first RB as learning data.

According to an embodiment, in operation 505, the receiving node 400 may identify or obtain second signals of which distortion is compensated based on the identified compensation values.

According to an embodiment, in order for the receiving node 400 to compensate for the distortion for the received first signals, the received first signals may need to be converted to a time domain. For example, the IFFT block 407 may convert a first data signal received in the first RB on the time domain. For example, the first data signal converted on the time domain may be indicated by a real number part and an imaginary number part.

According to an embodiment, a first data sample on the time domain may be input to the artificial neural network (e.g., the ESN block 408 of FIG. 4). The receiving node 400 may identify a compensate value output based on the first data sample input by the artificial neural network (or an output value of the artificial neural network).

According to an embodiment, the output compensation value may be a value in which the distortion for the first data signal is compensated on the time domain. For example, the output compensation value may be indicated by the real part and the imaginary part. In an example, the FFT block 409 of the receiving node 400 may convert the output compensate value to a frequency domain, and the receiving node 400 may identify a second data signal.

According to an embodiment, the second data signal may correspond to the first data signal. For example, the first data signal may correspond to a signal received in practice by the receiving mode 400, and the second data signal may correspond to a signal of which distortion is compensated for the signal received in practice by the receiving node 400.

In the disclosure, the artificial neural network may be referred to as a statistical learning algorithm derived through machine learning in software. For example, the term 'artificial neural network' may be replaced with an artificial intelligence model.

In the disclosure, an operation of the receiving node 400 may be referred to substantially as an operation of a controller included in the receiving node 400. The controller of the receiving node 400 of the disclosure may be replaced with a term for performing data processing or computing. For example, the controller may be replaced with at least one processor or computing device.

Figure 6:
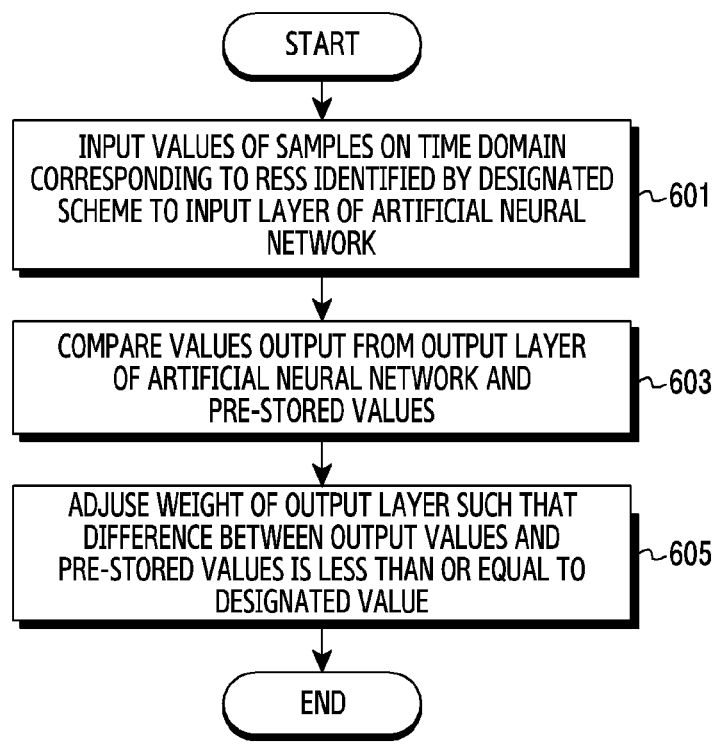
FIG. 6 is a diagram for illustrating a method for training an artificial neural network according to an embodiment of the disclosure.

FIG. 6 is a diagram for illustrating a method for training an artificial neural network according to an embodiment of the disclosure.

Referring to FIG. 6, an artificial neural network according to an embodiment may include an input layer including first nodes, an output layer including second nodes, and a hidden layer including third nodes for connecting the input layer and the output layer.

According to an embodiment, in operation 601, the receiving node 400 may input values of samples on a time domain corresponding to RSs identified by a designated scheme to the input layer of the artificial neural network. For example, in case that the receiving node 400 trains the artificial neural network, based on the first scheme, the receiving node 400 may input values of samples on a time domain corresponding to first RSs received in a first RB to the input layer of the artificial neural network. In an example, the receiving node 400 may obtain the values of the samples on the time domain by performing IFFT on the first RSs. In an example, the values of the samples on the time domain may be indicated by a real part and an imaginary part. In an example, the first RSs may be received in the same symbol.

For example, in case that the receiving node 400 trains the artificial neural network, based on a second scheme, the receiving node 400 may input values of samples on a time domain corresponding to the first RSs and second RSs received in the first RB to the input layer of the artificial neural network. In an example, the receiving node 400 may obtain the values of the samples on the time domain by performing IFFT on each of the first RSs and second RSs. In an example, the values of the samples on the time domain may be indicated by a real part and an imaginary part. As another example, in case that the receiving node 400 trains the artificial neural network, based on the second scheme, the receiving node 400 may input values of samples on a time domain corresponding to the first RSs and second RSs received in the first RB and third RSs received in a second RB to the input layer of the artificial neural network. In an example, the receiving unit 400 may obtain the values of the samples on the time domain by performing IFFT on each of the first RSs, second RSs, and third RSs. In an example, the first RSs may be received in a first symbol, and the second RSs may be received in a second symbol. The third RSs may be received in a third symbol.

For example, in case that the receiving node 400 trains the artificial neural network, based on a third scheme, the receiving node 400 may input values of samples on a time domain corresponding to some of the first RSs received in the first RB to the input layer of the artificial neural network. In an example, the receiving node 400 may obtain the values of the samples on the time domain by performing IFFT on each of some of the first RSs.

According to an embodiment, some of the first RSs input to the input layer may be determined based on the time domain. For example, upon training the artificial neural network by using the third scheme, the receiving node 400 may convert all of the first RSs to the samples on the time domain through IFFT. The receiving node 400 may input first samples before a designated time to the input layer among the samples on the time domain. The receiving node 400 may remove or discard second samples after the designated time among the samples on the time domain. For example, the second samples after the designated time may not be input to the input layer, and may not be utilized as learning data of the artificial neural network.

According to an embodiment, in operation 603, the receiving node 400 may compare values output from an output layer of the artificial neural network and pre-stored values. For example, in case that the receiving node 400 trains the artificial neural network, based on the first scheme, the receiving node 400 may identify output values of the artificial neural network for the first RSs. The receiving node 400 may compare values pre-stored for the first RSs and the output values of the artificial neural network for the first RSs. In an example, the values pre-stored for the first RSs may be values for signals transmitted substantially from the transmitting node 403.

For example, in case that the receiving node 400 trains the artificial neural network, based on the second scheme, the receiving node 400 may identify output values of the artificial neural network for the first RSs and second RSs. The receiving node 400 may compare values pre-stored for the first RSs and output values of the artificial neural network for the first RSs, and may compare values pre-stored for the second RSs and output values of the artificial neural network for the second RSs. In an example, the values pre-stored for the first RSs may be values for signals transmitted substantially from the transmitting node 430. The values pre-stored for the second RSs may be values for signals transmitted substantially from the transmitting node 430.

According to an embodiment, in operation 605, the receiving node 400 may adjust a weight of an output layer such that a difference between the output values and the pre-stored values is less than or equal to a designated value. For example, in case that the receiving node 400 trains the artificial neural network, based on the first scheme, the weight of the output layer may be adjusted or controlled such that the difference between the values pre-stored for the first RSs and the output values of the artificial neural network for the first RSs is less than or equal to a designated value. For example, in case that the receiving node 400 trains the artificial neural network, based on the second scheme, the weight of the output layer may be adjusted such that a difference between the values pre-stored for the first RSs and the output values of the artificial neural network for the first RSs is less than or equal to a designated value, and such that a difference between the values pre-stored for the second RSs and the output values of the artificial neural network for the second RSs is less than or equal to a designated value.

For example, in case that the receiving node 400 trains the artificial neural network, based on the third scheme, the weight of the output layer may be adjusted such that values pre-stored for some of the first RSs and the output values of the artificial neural network for some of the first RSs is less than or equal to a designated value.

Equation 1 is an equation for calculating a weight $W_{out}$ of an output layer to have a minimum difference between output values and pre-stored values. In [Equation 1], R(k) may be referred to as k-$^{th}$ states of reservoir. x(k) may be referred to as k-$^{th}$ input vectors, and y(k) may be referred to as k-$^{th}$ output vectors. $W_{in}$ may be referred to as input weight metrics, and $W_{out}$ may be referred to as output weight metrics. W may be referred to as a weight metric of reservoir nodes. $\emptyset(n)$ may be referred to as tanh(n).

$$W_{out} = \min_{\hat{W}}(\|y - \hat{W}[\emptyset(R); x]\|) = y([\emptyset(R); x])^{-1} \ldots \quad \text{Equation 1}$$

According to an embodiment, the receiving node 400 may obtain a weight $W_{out}$ of an output layer satisfying Equation 1, and may compensate for distortion of a signal by using the artificial neural network to which the weight $W_{out}$ of the output layer is applied.

Although it has been described in the disclosure that the receiving node 400 selects one of the first scheme, the second scheme, and the third scheme to train the artificial neural network, this is only an example. For example, the receiving node 400 may select one of the first scheme and the second scheme to train the artificial neural network. As another example, the receiving node 400 may select one of the first scheme and the third scheme to select the artificial neural network.

Figure 7:
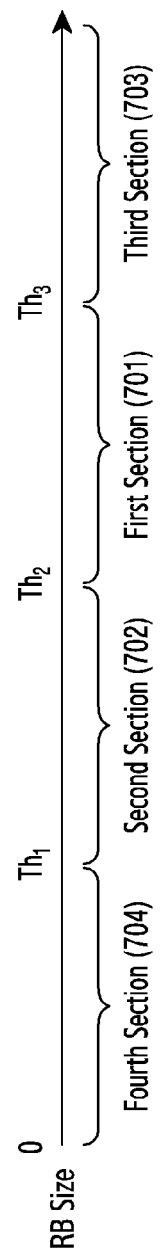
FIG. 7 is a diagram for illustrating sections in which designated schemes are performed according to an embodiment of the disclosure.

FIG. 7 is a diagram for illustrating sections in which designated schemes are performed according to an embodiment of the disclosure.

Referring to FIG. 7, sections depending on an RB size are illustrated according to an embodiment. According to an embodiment, a first section 701 may be a section in which the RB size is between a first threshold Th1 and a second threshold Th2. A second section 702 may be a section in which the RB size is less than or equal to the first threshold Th1 and greater than or equal to a third threshold Th3. A third section 703 may be a section in which the RB size is greater than or equal to the second threshold Th2. A fourth section 704 may be a section in which the RB size is less than or equal to the third threshold Th3.

As another example, the second section 702 may be a section lower than the first section 701, and the third section 703 may be a section higher than the first section 701. The fourth section 704 may be a section lower than the second section 702.

According to an embodiment, the receiving node 400 may train the artificial neural network in the first section 701 by the first scheme or based on the first scheme. For example, a section (e.g., the first section 701) in which the receiving node 400 trains the artificial neural network, based on the first scheme, may correspond to a standard AI-non-linearity compensation (NC) section.

According to an embodiment, the receiving node 400 may train the artificial neural network in the second section 702 by the second scheme or based on the second scheme. In an embodiment, in the second section 702 in which the RB size is relatively small, the receiving node 400 may train the artificial neural network, based on the second scheme, to increase reliability of the artificial neural network. For example, in case that the artificial neural network is trained based on the first scheme in the second section 702 in which an RB size is relatively small compared to the first scheme, the artificial neural network may over-fit to a case of a relatively smaller RB. On the other hand, in case that the receiving node 400 according to an embodiment trains the artificial neural network in the second section 702, based on the second scheme, the artificial neural network may use not only first RBs but also second RBs so as to be prevented from being over-fitted even in case of a small RB.

According to an embodiment, the receiving node 400 may train the artificial neural network in the third section 703 by the third scheme or based on the third scheme. In an embodiment, in the third section 703 in which the RB size is relatively large, the receiving node 400 may minimize or reduce a computing resource and/or time consumed to train the artificial neural network, by training the artificial neural network, based on the third scheme. For example, in the third section 703 in which the RB size is relatively large compared to the first section 701, in case that the artificial neural network is trained based on the third scheme, the artificial neural network may need to perform training on RSs included in relatively many RBs, and a computing resource and time consumed to train the artificial neural network may be relatively increased. On the other hand, in case that the receiving node 400 according to an embodiment trains the artificial neural network in the third section 703, based on the third scheme, the artificial neural network may use only some of the first RSs to minimize or reduce a computing resource and/or time consumed in the training.

According to an embodiment, the receiving node 400 may not perform the training of the artificial neural network in the fourth section 704. For example, the first threshold Th1 corresponding to a boundary of the fourth section 704 and the second section 702 may be a minimum value of a size of an RB in which the training of the artificial neural network is possible. Therefore, the receiving node 400 may not perform the training of the artificial neural network in case that a size of an allocated RB is less than or equal to the third threshold Th1.

According to an embodiment, the receiving node 400 may transmit information (or a message) for requesting a change of an RB size to the transmitting node 403 in case that there is a need to change a size of a received RB. For example, the receiving node 400 may receive signals in the first RB from the transmitting node 430, and in case that there is a need to change a size of a first RB, may transmit information for requesting a change of a size of an RB to be transmitted after the first RB to the transmitting node 430.

For example, the receiving node 400 may receive information on the first RB to be transmitted from the transmitting node 430, and may transmit information for requesting the change of the size of the first RB to the transmitting node 430. In an example, upon receiving information on the size of the first RB from the transmitting node 430, the receiving node 400 may transmit information on parameters related to the artificial neural network to the transmitting node 430. In an example, the artificial neural network may be an artificial neural network trained by a scheme determined based on the size of the first RB. In an example, the information on the parameters related to the artificial neural network may include the first threshold Th1 corresponding to the boundary of the first section 701 and the second section 702 and/or the second threshold Th2 corresponding to the boundary of the first section 701 and the third section 703.

According to an embodiment, thresholds for identifying the sections may be based on the artificial neural network and/or a type of a power amplifier of the transmitting node 430. For example, the thresholds corresponding to the boundary of the sections may vary based on the type of the power amplifier (e.g., an A-grade amplifier, a B-grade amplifier, an AB-grade amplifier, a C-grade amplifier).

For example, the A-grade amplifier may correspond to an amplifier of which an output signal is converted throughout 360 degrees of a cycle, and the B-grade amplifier may correspond to an amplifier of which an output signal is converted throughout 180 degrees of the cycle. For example, thresholds corresponding to the boundary of the sections may vary depending on the number (or complexity) of nodes of the artificial neural network.

Although it is expressed in the disclosure that the receiving node 400 trains the artificial neural network, this is only an example, and thus the artificial neural network may learn through machine learning.

Figure 8:
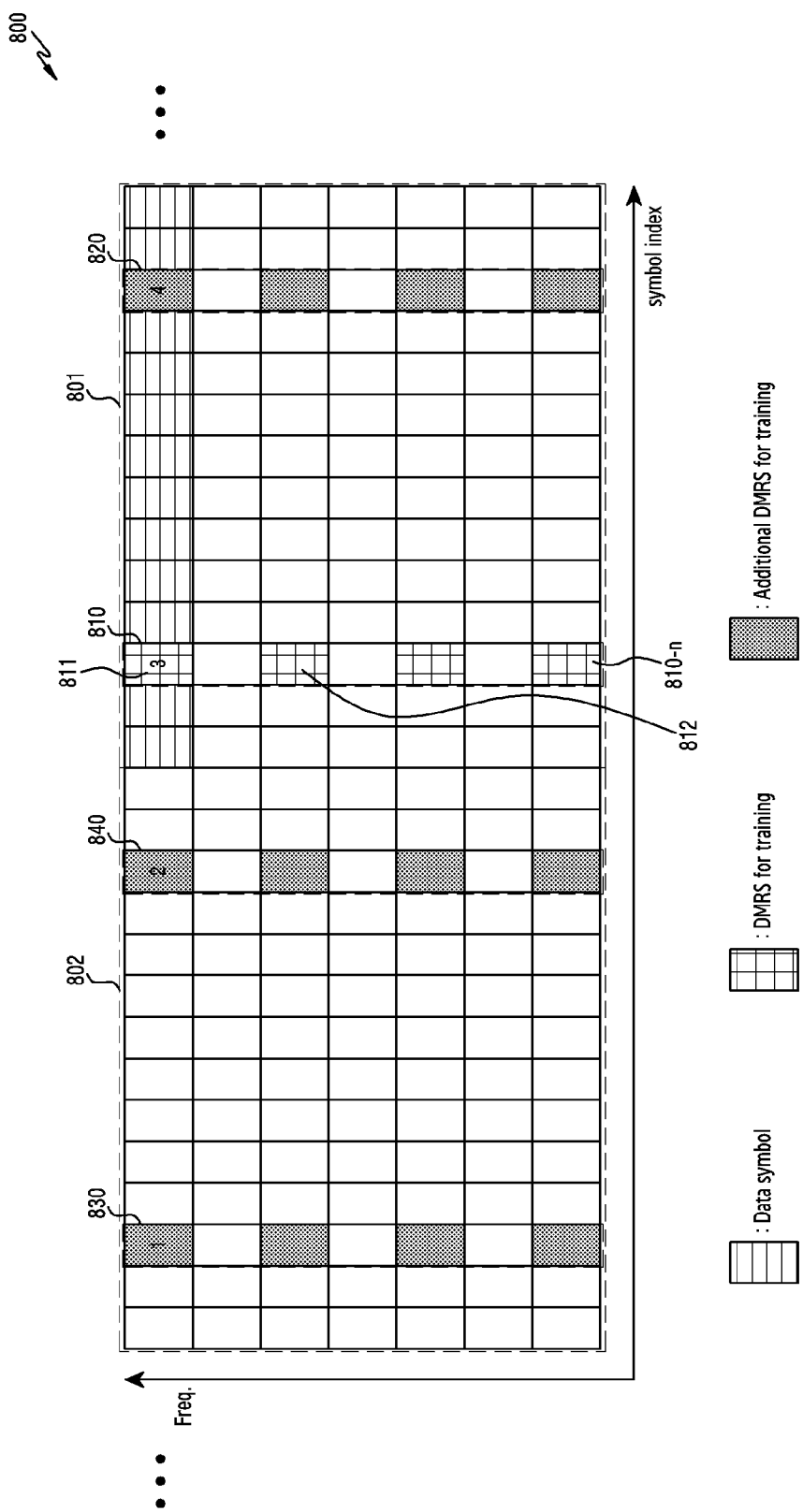
FIG. 8 is a diagram for illustrating RS signals and data signals which are input to an artificial neural network according to an embodiment of the disclosure.

FIG. 8 is a diagram for illustrating RS signals and data signals which are input to an artificial neural network according to an embodiment of the disclosure.

Referring to FIG. 8, RBs 800 according to an embodiment may include a first RB 801 and a second RB 802. The second RB 802 may correspond to an RB received before the first RB 801.

According to an embodiment, a first RSs 810 and a second RSs 820 may be received in the first RB 801 from the transmitting node 430 to the receiving node 400. For example, the first RBs 810 may include a first RS 811 received on one OFDM symbol, and the first RSs 810 may include a second RS 812 received on one OFDM symbol. The first RSs 810 may include an n-$^{th}$ RS 810-n received on one OFDM symbol.

According to an embodiment, the first RSs 810 and/or the second RSs 820 may be transmitted or received on various physical channels.

For example, the first RSs 810 and/or the second RSs 820 may be transmitted and/or received on a physical uplink shared channel (PUSCH). As another example, the first RSs 810 and/or the second RSs 820 may be transmitted and/or received on a physical downlink shared channel (PDSCH). As another example, the first RSs 810 and/or the second RSs 820 may be transmitted and/or received on a physical downlink control channel (PDCCH). For example, the first RSs 810 and/or the second RSs 820 may be transmitted and/or received on a physical uplink control channel (PUCCH).

According to an embodiment, third RSs 830 and fourth RSs 840 may be received in a second RB 802 from the transmitting node 430 to the receiving node 400.

According to an embodiment, the receiving node 400 may determine the learning data of the artificial neural network, based on the number of the received first RBs 801.

For example, the receiving node 400 may identify that the number of the received first RBs 801 is included in the first section 701. The receiving node 400 may train the artificial neural network by using the first RSs 810 in the first RB 801, based on a first scheme. For example, the receiving node 400 may utilize the first RSs 810 in the first RB 801 as the learning data for training the artificial neural network.

For example, the receiving node 400 may identify that the number of the first RBs 801 is included in the second section 702. The receiving node 400 may train the artificial neural network by using the first RSs 810 and second RSs 820 in the first RB 801, based on a second scheme. For example, the receiving node 400 may utilize the first RSs 810 and second RSs 820 in the first RB 801 as learning data for training the artificial neural network. As another example, the receiving node 400 may utilize the first RSs 810 and second RSs 820 in the first RB 801 and the third RSs 830 and/or fourth RSs 840 in the second RB 802 as the learning data for training the artificial neural network.

For example, the receiving node 400 may identify that the number of the first RBs 801 is included in the third section 703. The receiving node 400 may train the artificial neural network by using some of the first RSs 810 in the first RB 801, based on a third scheme. For example, the receiving node 400 may utilize only some of the first RSs 810 in the first RB 801 as learning data for training the artificial neural network.

Although it is described in the disclosure that the RBs 800 includes the first RB 801 and the second RB 802, this is only an example. In practice, the RBs 800 may further include RBs after the first RB 801 and RBs before the second RBs 802.

Figure 9:
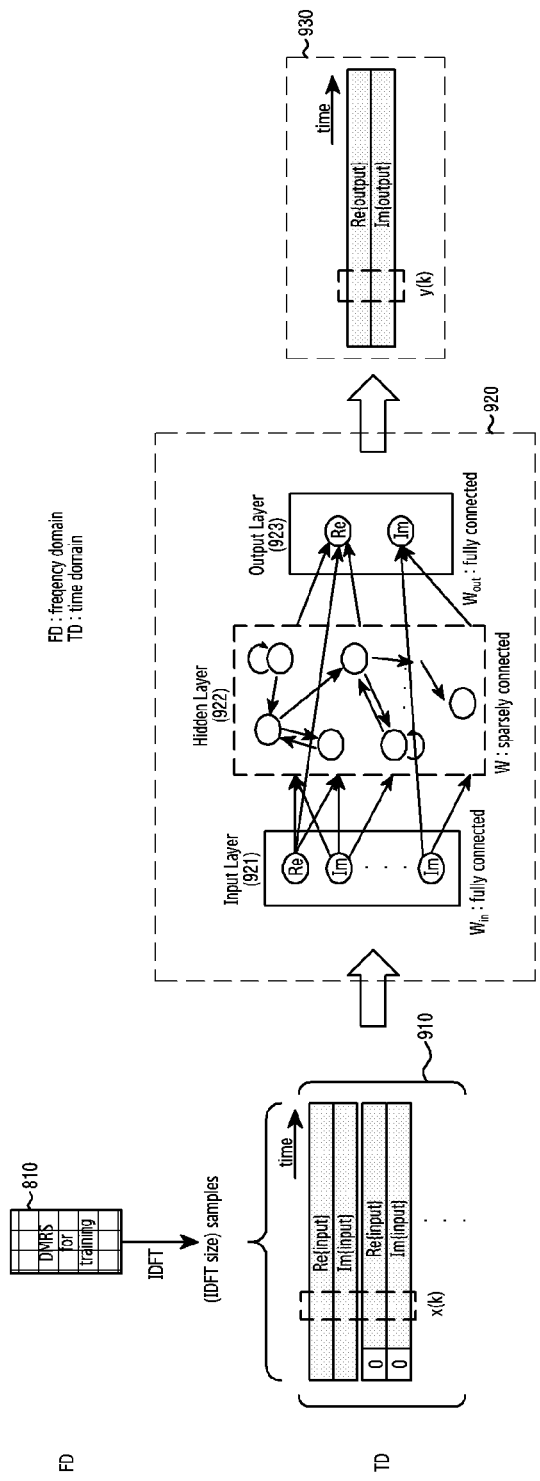
FIG. 9 is a diagram for illustrating a method in which a receiving node trains an artificial neural network by using first RS signals, based on a first scheme according to an embodiment of the disclosure.

FIG. 9 is a diagram for illustrating a method in which a receiving node trains an artificial neural network by using first RS signals, based on a first scheme according to an embodiment of the disclosure.

Referring to FIG. 9, the receiving node 400 according to an embodiment may identify, determine, or extract the first RBs 810 in the first RB 801, based on the first scheme.

According to an embodiment, the receiving node 400 may perform inverse discrete Fourier transform (IDFT) on the first RSs 810. For example, the IFFT block 407 of the receiving node 400 may perform the IDFT on the first RSs 810.

According to an embodiment, since IDFT is performed on the first RSs 810, the receiving node 400 may obtain first samples 910 on a time domain. For example, the receiving node 400 may convert first RSs 810 to the first samples 910 on the time domain through the IDFT.

According to an embodiment, the receiving node 400 may input the first samples 910 on the time domain to an input layer 921 of an artificial neural network 920. For example, the receiving node 400 may input a k-order input value x(k) of the first samples 910 on the time domain to the input layer 921 of the artificial neural network 920. For example, the k-order input value x(k) may be referred to as a k-order sample on the time domain.

According to an embodiment, since the k-order input value x(k) is input to the input layer 921, a k-order output value y(k) may be output in an output layer 923. Since the k-order input value x(k) is input to the artificial neural network 920, a value corresponding to the k-order input value x(k) may be delivered to the output layer 923 through a hidden layer 922, and the output layer 923 may output the k-order output value y(k).

According to an embodiment, since the receiving node 400 inputs values from a first-order input value to an n-order input value to the artificial neural network 920, first output values 930 may be output. For example, the first output values 930 may include a first-order output value, . . . , a k-order output value y(k), . . . , an n-order output value.

According to an embodiment, the receiving node 400 may compare values of the first samples 910 on the time domain and the first output values 930 to determine at least one weight of the artificial neural network 920 so that a difference of the comparison is less than or equal to a designated value. For example, the receiving node 400 may compare the values of the first samples 910 on the time domain and the output values 930 to determine an input layer weight $W_{in}$, an output layer weight $W_{out}$, and/or a hidden layer weight W so that a difference of the comparison is less than or equal to a designated value.

According to an embodiment, the receiving node 400 may perform compensation of distorted signals (e.g., first signals) by using the artificial neural network 920 based on the determined at least one weight. For example, the receiving node 400 may receive the first signals, and the first signals may be distorted due to nonlinearity of a power amplifier of the transmitting node 430. The receiving node 400 may perform IDFT or IFFT on first data signals of the first signals, and the receiving node 400 may obtain first samples. The receiving node 400 may output the first samples to the artificial neural network 920 based on the determined at least one weight. Upon inputting the first samples, the receiving node 400 may identify compensation values output from the artificial neural network 920.

In an example, the receiving node 400 may perform FFT on the output compensation values, and may obtain second signals. For example, the second signals may correspond to a signal substantially subjected to compensation for distortion of the first signals.

Figure 10:
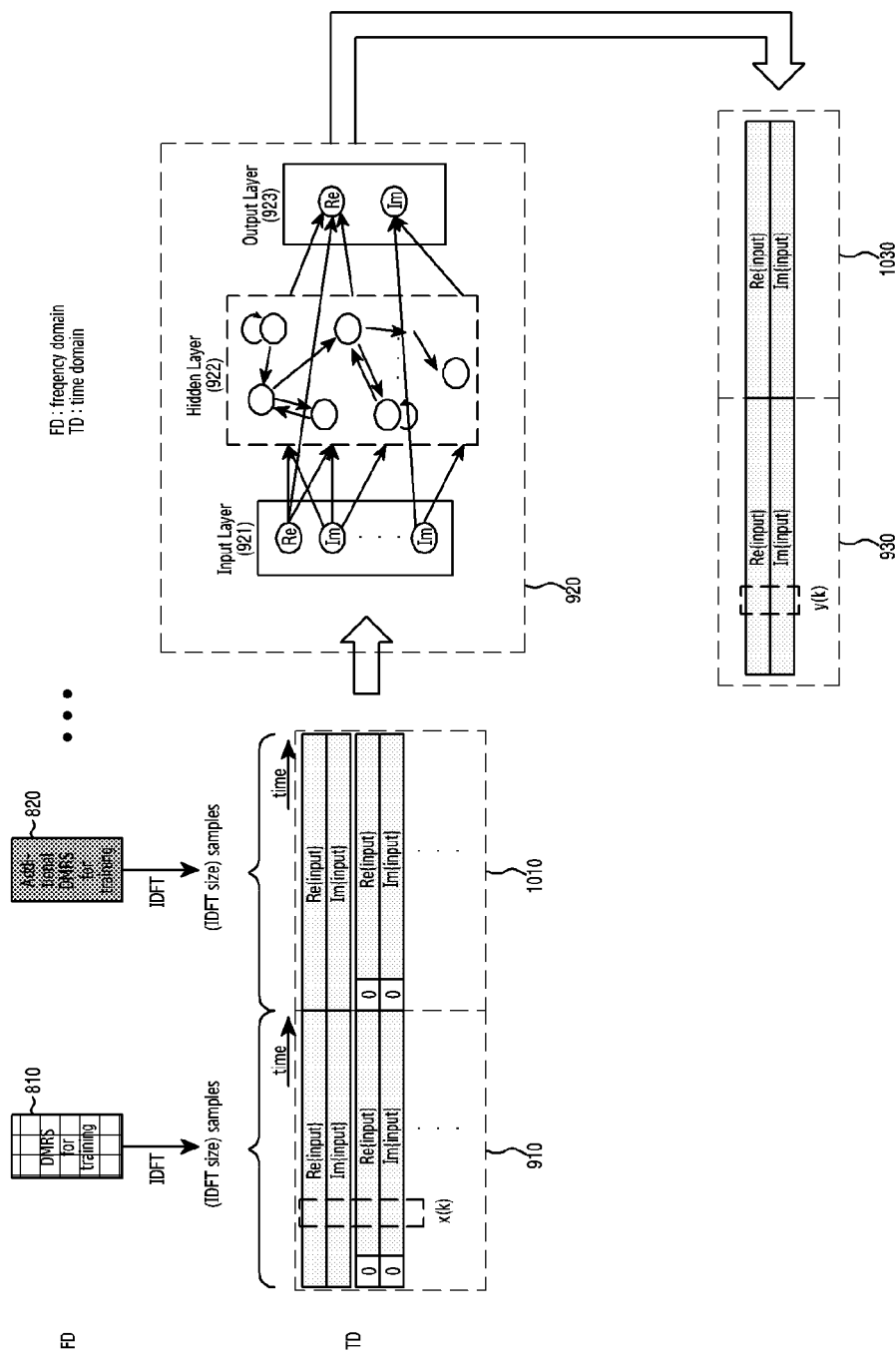
FIG. 10 is a diagram for illustrating a method in which a receiving node trains an artificial neural network by using first RS signals, based on a second scheme, according to an embodiment of the disclosure.

FIG. 10 is a diagram for illustrating a method in which a receiving node trains an artificial neural network by using first RS signals, based on a second scheme, according to an embodiment of the disclosure.

Referring to FIG. 10, the receiving node 400 according to an embodiment may identify, determine, or extract the first RSs 810 and second RSs 820 in the first RB 801, based on the second scheme.

According to an embodiment, the receiving node 400 may perform inverse discrete Fourier transform (IDFT) on each of the first RSs 810 and second RSs 820. For example, the IFFT block 407 of the receiving node 400 may perform IDFT on the first RSs 810. For example, the IFFT block 407 of the receiving node 400 may perform IDFT on the second RSs 820.

According to an embodiment, since IDFT is performed on the first RSs 810, the receiving node 400 may obtain first samples 910 on a time domain. For example, the receiving node 400 may convert first RSs 810 to the first samples 910 on the time domain through the IDFT. In an embodiment, since IDFT is performed on the second RSs 820, the receiving node 400 may obtain second samples 1010 on the time domain. For example, the receiving node 400 may convert the second RSs 820 to the second samples 1010 on the time domain.

According to an embodiment, the receiving node 400 may input the first samples 910 on the time domain to an input layer 921 of an artificial neural network 920. For example, the receiving node 400 may input a k-order input value x(k) of the first samples 910 on the time domain to the input layer 921 of the artificial neural network 920. For example, the k-order input value x(k) may be referred to as a k-order sample on the time domain. In an embodiment, the receiving node 400 may input the second samples 1010 on the time domain to the input layer 921 of the artificial neural network 920.

According to an embodiment the second samples 1010 may be concatenated to the first samples 910. For example, the second samples 1010 may be later than the first samples 910 on the time domain, and may be concatenated to the first samples 910.

According to an embodiment, since the k-order input value x(k) is input to the input layer 921, a k-order output value y(k) may be output in an output layer 923. Since the k-order input value x(k) is input to the artificial neural network 920, a value corresponding to the k-order input value x(k) may be delivered to the output layer 923 through a hidden layer 922, and the output layer 923 may output the k-order output value y(k).

According to an embodiment, since the receiving node 400 inputs values from a first-order input value of the first samples 910 to an n-order input value to the artificial neural network 920, the first output values 930 may be output. For example, the first output values 930 may include a first-order output value, . . . , a k-order output value y(k), . . . , an n-order output value. In an embodiment, since the receiving node 400 inputs values from an (n+1)-order input value of the second samples 1010 to a 2n-order input value to the artificial neural network 920, the second output values 1030 may be output. For example, the second output values 1030 may include an (n+1)-order output value, . . . , a 2n-order output value.

According to an embodiment, the receiving node 400 may compare values of the first samples 910 on the time domain and the first output values 930 and second output values 1030 to determine at least one weight of the artificial neural network 920 so that a difference of the comparison is less than or equal to a designated value. For example, the receiving node 400 may compare the values of the first samples 910 on the time domain and the output values 930 to determine an input layer weight $W_{in}$, an output layer weight $W_{out}$, and/or a hidden layer weight W so that a difference of the comparison is less than or equal to a designated value. For example, the receiving node 400 may compare the values of the second samples 10110 on the time domain and the output values 1030 to determine an input layer weight $W_{in}$, an output layer weight $W_{out}$, and/or a hidden layer weight W so that a difference of the comparison is less than or equal to a designated value.

According to an embodiment, the receiving node 400 may perform compensation of distorted signals (e.g., first signals) by using the artificial neural network 920 based on the determined at least one weight. For example, the receiving node 400 may receive the first signals, and the first signals may be distorted due to nonlinearity of a power amplifier of the transmitting node 430. The receiving node 400 may perform IDFT or IFFT on first data signals of the first signals, and the receiving node 400 may obtain first samples. The receiving node 400 may output the first samples to the artificial neural network 920 based on the determined at least one weight. Upon inputting the first samples, the receiving node 400 may identify compensation values output from the artificial neural network 920.

In an example, the receiving node 400 may perform FFT on the output compensation values, and may obtain second signals. For example, the second signals may correspond to a signal substantially subjected to compensation for distortion of the first signals.

Figure 11A:
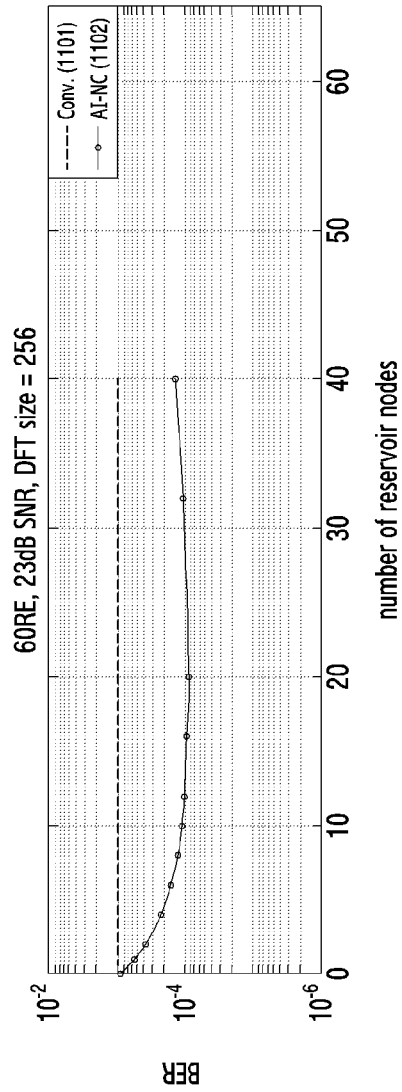
FIG. 11A is a diagram for illustrating a bit error rate (BER) depending on a number of nodes of an artificial neural network according to an embodiment of the disclosure.

FIG. 11A is a diagram for illustrating a BEF depending on a number of nodes of an artificial neural network according to an embodiment of the disclosure.

Referring to FIG. 11A, a first graph 1101 according to an embodiment may be referred to a bit error rate (BER) of a case where artificial intelligence (AI)-non-linearity compensation (NCI) is not utilized. A second graph 1102 may be referred to as a BER depending on the number of nodes of the artificial neural network 920 in a case where the receiving node 400 trains the artificial neural network 920, based on a first scheme.

According to an embodiment, since the first graph 1101 corresponds to a case where the artificial neural network 920 is not utilized, values indicated by the first graph 1101 may not be affected by the number of nodes of the artificial neural network 920. For example, the first graph 1101 may indicate a constant value, such as a constant function. For example, the first graph 1101 may correspond to a reference line or reference function for the second graph.

According to an embodiment, since the second graph 1102 corresponds to a case where the artificial neural network 920 is utilized, values indicated by the second graph 1102 may not be affected by the number of nodes of the artificial neural network 920.

For example, the second graph 1102 may indicate a BER value which decreases gradually in case that the number of nodes increases up to a designated value (e.g., 20). The second graph 1102 may indicate a relatively constant BER value in case that the number of nodes increases to be greater than or equal to the designated value (e.g., 20). For example, an increase in complexity of the artificial neural network 920 may result in an increase in reliability of the artificial neural network 920, but the BER value may be saturated in case that the number of nodes exceeds the designated value (e.g., 20).

As a result, in case that the receiving node 400 trains the artificial neural network 920, based on only the first scheme, the BER value may be saturated even if there is an increase in complexity of the artificial neural network 920 or the number of nodes of the artificial neural network 920.

Figure 11B:
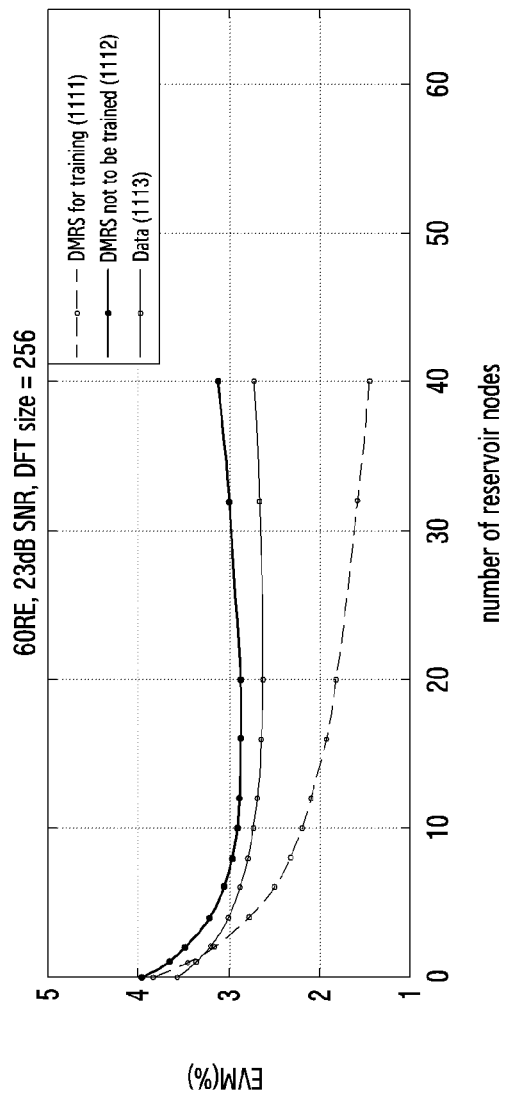
FIG. 11B is a diagram for illustrating an error vector magnitude (EVM) depending on a number of nodes of an artificial neural network according to an embodiment of the disclosure.

FIG. 11B is a diagram for illustrating an EVM depending on a number of nodes of an artificial neural network according to an embodiment of the disclosure.

Referring to FIG. 11B, a first graph 1111 according to an embodiment may be referred to as an EVM of a DMRS utilized to train the artificial neural network 920 depending on the number of nodes of the artificial neural network 920 trained based on a first scheme. For example, the first graph 1111 may be referred to as an EVM of a DMRS corresponding to a case where the training by the ESN block 408 of FIG. 4 is not utilized. For example, the case where the training by the ESN block 408 is not utilized may be referred to as a case where the first scheme, second scheme, and third scheme described in FIG. 5 are not utilized.

According to an embodiment, the second graph 1112 may be referred to as an EVM of a DMRS not utilized to train the artificial neural network 920 depending on the number of nodes of the artificial neural network 920 trained based on the first scheme. For example, the second graph 1112 may be referred to as an EVM of a DMRS corresponding to a case where the training by the ESN block 408 of FIG. 4 is not utilized. For example, the case where the training by the ESN block 408 is not utilized may be referred to as a case where the first scheme, second scheme, and third scheme described in FIG. 5 are not utilized.

According to an embodiment, the third graph 1113 may be referred to as an EVM of a data signal depending on the number of nodes of the artificial neural network 920 trained based on the first scheme. For example, the third graph 1113 may be referred to a an EVM of a data signal corresponding to a case where the training by the ESN block 408 of FIG. 4 is not utilized.

It may be identified that the EVM gradually decreases in case that the number of nodes of the artificial neural network 920 increases up to a designated value (e.g., 10). On the other hand, the EVM may be saturated or may rather increase in case that the number of nodes of the artificial neural network 920 increase to be greater than or equal to the designed value (e.g., 10).

For example, it is shown in the first graph 1111 and the second graph 1112 that the EVM value gradually increases in case that the number of the artificial neural networks 920 increases to be greater than or equal to the designated value (e.g., 10).

As a result, in case that the receiving node 400 trains the artificial neural network 920, based on only the first scheme, the BER value may be saturated even if there is an increase in complexity of the artificial neural network 920 or the number of nodes of the artificial neural network 920.

Figure 12A:
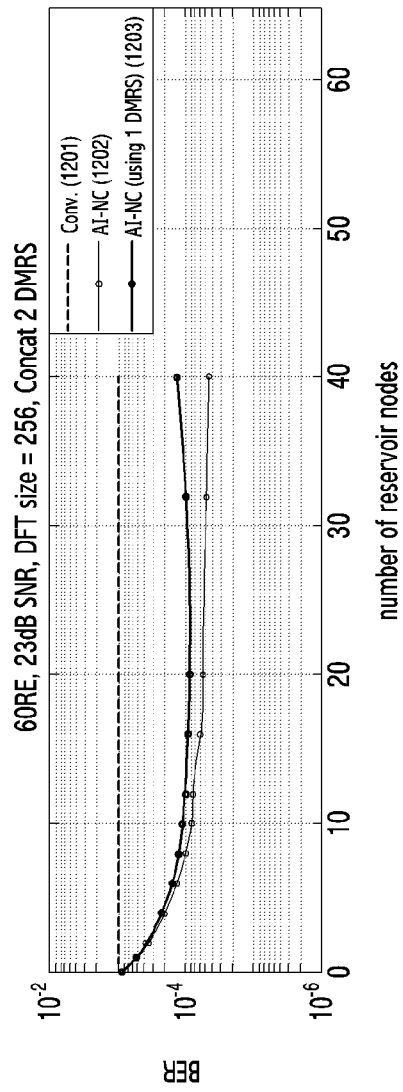
FIG. 12A is a diagram for comparing an artificial neural network trained based on a first scheme and an artificial neural network trained based on a second scheme, according to an embodiment of the disclosure.

FIG. 12A is a diagram for comparing an artificial neural network trained based on a first scheme and an artificial neural network trained based on a second scheme according to an embodiment of the disclosure.

Referring to FIG. 12A, a first graph 1201 according to an embodiment may be referred to a bit error rate (BER) of a case where artificial intelligence (AI)-non-linearity compensation (NCI) is not utilized. For example, the first graph 1201 may be referred to as a reference graph.

According to an embodiment, a second graph 1201 may be referred to as a BER depending on the number of nodes of the artificial neural network 920 in a case where the receiving node 400 trains the artificial neural network 920, based on the first scheme, in case that an RB size is 60. A third graph 1203 may be referred to as a BER depending on the number of nodes of the artificial neural network 920 in a case where the receiving node 400 trains the artificial neural network 920, based on a second scheme, in case that the RB size is 60.

In case of the artificial neural network 920 trained based on the first scheme, the BER increases in case that the number of nodes of the artificial neural network 920 exceeds a designated value (e.g., 20) as indicated in the second graph 1201. On the other hand, in case of the artificial neural network 920 trained based on the second scheme according to an embodiment, the BER may not be saturated or may not increase even if the number of nodes of the artificial neural network 920 exceeds the designated number (e.g., 20) as indicated in the third graph 1203.

As a result, in case that the number of REs included in an RB according to an embodiment is 60, reliability of an output value of the artificial neural network 920 may increase in a case where the artificial neural network 920 is trained based on the second scheme compared to a case where the artificial neural network 920 is trained based on the first scheme.

Therefore, reliability of the artificial neural network 920 may increase in a case where the artificial neural network 920 is trained based on the first scheme or the second scheme according to the number of RBs compared to a case where the artificial neural network 920 is trained based on only the first scheme.

Figure 12B:
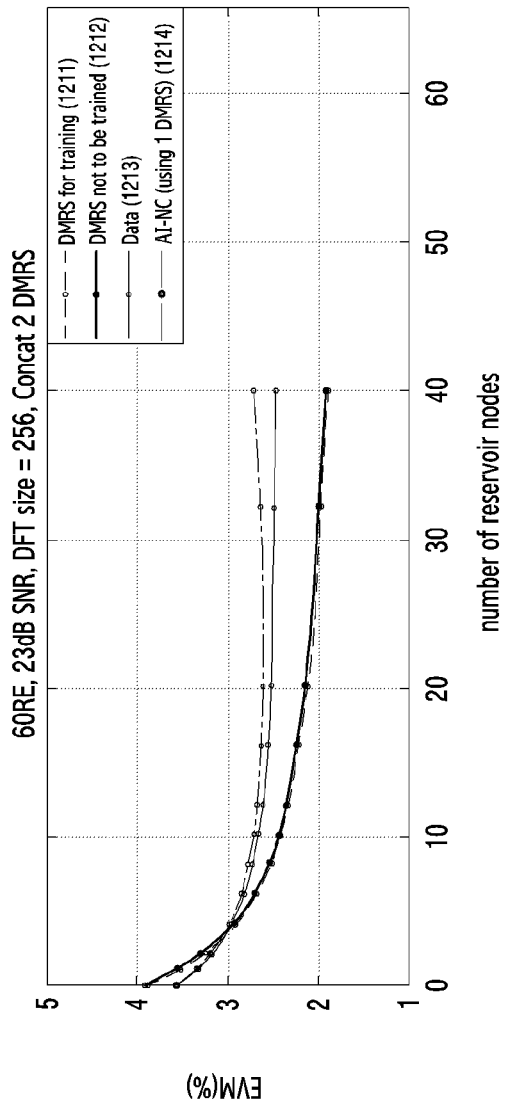
FIG. 12B is a diagram for illustrating an EVM depending on a number of nodes of an artificial neural network according to an embodiment of the disclosure.

FIG. 12B is a diagram for illustrating an EVM depending on a number of nodes of an artificial neural network according to an embodiment of the disclosure.

Referring to FIG. 12B, a first graph 1211 according to an embodiment may be referred to as an EVM of a DMRS utilized to train the artificial neural network 920 depending on the number of nodes of the artificial neural network 920 trained based on a first scheme.

According to an embodiment, a second graph 1212 may be referred to as an EVM of a DMRS not utilized to train the artificial neural network 920 depending on the number of nodes of the artificial neural network 920 trained based on the second scheme. A third graph 1213 may be referred to as an EVM of a data signal depending on the number of nodes of the artificial neural network 920, a fourth graph 1214 may be referred to as an EVM of a data signal depending on the number of nodes of the artificial neural network 920 trained based on the first scheme.

According to an embodiment, in the first graph 1211 for a case where the artificial neural network 920 is trained based on the first scheme which uses the first RS signals (e.g., DMRS) and the second graph 1212 for a case where the artificial neural network 920 is trained based on the second scheme which uses the first RS signals and the second RS signals, it may be shown that an EVM gradually decreases with an increase in the number of nodes of the artificial neural network 920.

Figure 12C:
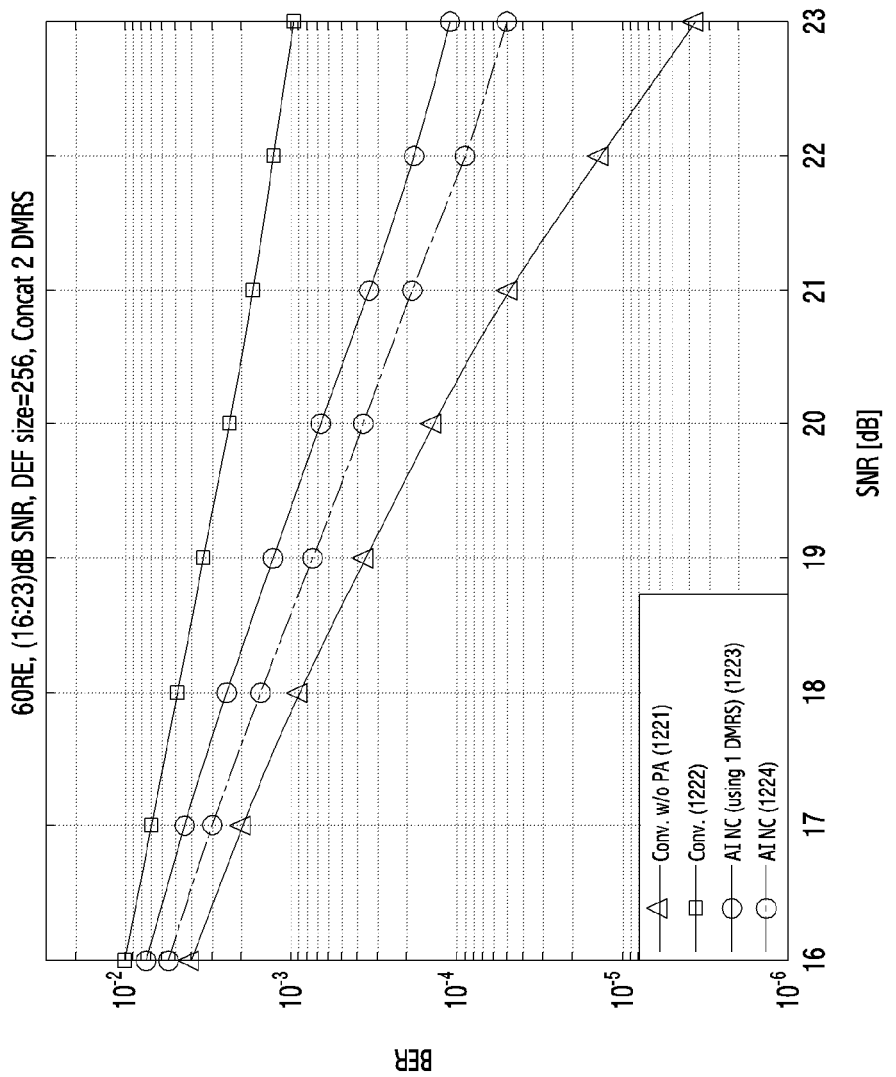
FIG. 12C is a diagram for comparing a BER depending on a signal to noise ratio (SNR) in a case where an artificial neural network is not utilized, a case where an artificial neural network trained based on a first scheme is utilized, and a case where an artificial neural network trained based on a second scheme is utilized according to an embodiment of the disclosure.

FIG. 12C is a diagram for comparing a BER depending on a signal to noise ratio (SNR) in a case where an artificial neural network is not utilized, a case where an artificial neural network trained based on a first scheme is utilized, and a case where an artificial neural network trained based on a second scheme is utilized according to an embodiment of the disclosure.

Referring to FIG. 12C, a first graph 1221 according to an embodiment may be referred to as a graph for a BER in case that distortion caused by a power amplifier of the transmitting node 430 is not considered. A second graph 1222 may be referred to as a graph for a BER in case that distortion caused by the power amplifier of the transmitting node 430 exists and the artificial neural network is not utilized. A third graph 1223 may be referred to as a graph for a BER in case that the artificial neural network trained based on the first scheme is utilized. A fourth graph 1224 may be referred to as a graph for a BER in case that the artificial neural network trained based on the second scheme is utilized.

According to an embodiment, the fourth graph 1224 illustrates a BER smaller by about 0.7 to 0.8 dB with respect to the same SNR standard compared to the first graph 1223. For example, in case that an RB size is 60, the receiving node 400 may secure a relatively small BER with respect to the same SNR standard in the case where the artificial neural network 920 is trained based on the second scheme, compared to the case where the artificial neural network 920 is trained based on the first scheme.

As a result, reliability of an output value output from the artificial neural network 920 may increase in the case of training the artificial neural network 920, based on the first scheme or the second scheme according to the number of RBs, compared to the case where the receiving node 400 trains the artificial neural network 920, based on only the first scheme.

Figure 13:
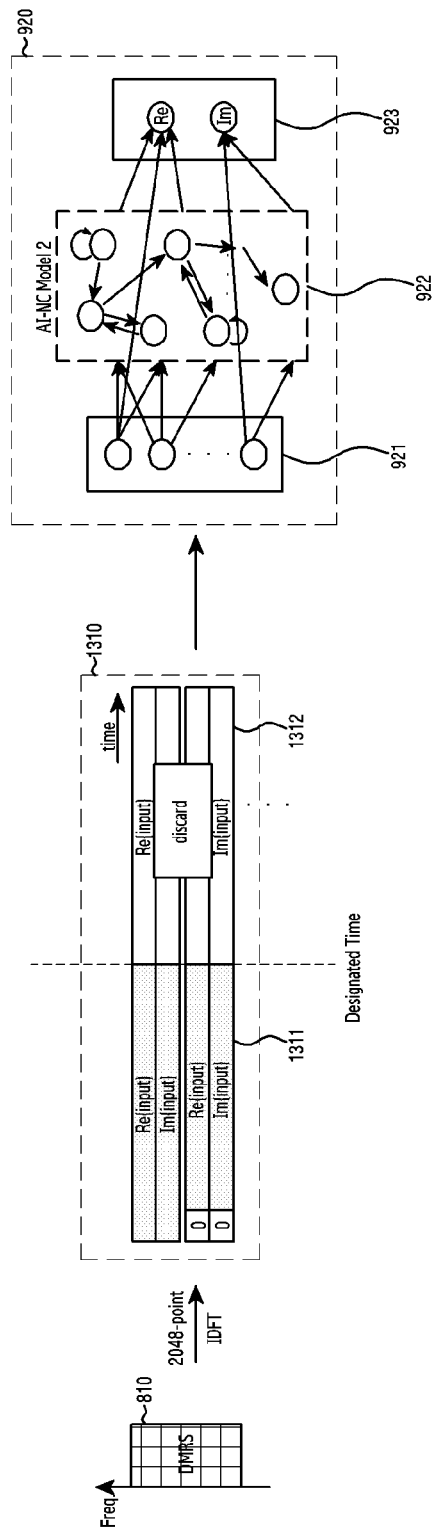
FIG. 13 is a diagram for illustrating a case where an artificial neural network is trained based on a third scheme according to an embodiment of the disclosure.

FIG. 13 is a diagram for illustrating a case where an artificial neural network is trained based on a third scheme according to an embodiment of the disclosure.

Referring to FIG. 13, the receiving node 400 according to an embodiment may identify, determine, or extract some of the first RSs 810 in the first RB 801, based on the third scheme. For example, the receiving node 400 may identify the first RSs 810 transmitted in the same symbol among signals received in the first RB 801. The receiving node 400 may perform IFFT on the first RSs 810, and may convert the first RSs 810 to samples 1310 on a time domain. The receiving node 400 may select first samples 1311 before a designated time among the samples 1310 on the time domain. The receiving node 400 may remove or discard second samples 1312 after the designated time among the samples 1310 on the time domain.

According to an embodiment, the receiving node 400 may remove the second samples 1312 and train the artificial neural network 920 by using only the first samples 1310, thereby reducing or minimizing a resource and/or time consumed to train the artificial neural network 920.

According to an embodiment, the number of samples 1310 on the time domain of FIG. 13 may be relatively greater than the number of first samples 910 on the time domain of FIG. 1. For example, the receiving node 400 may perform IFFT on the first RSs 810, and the receiving node 400 may identify the first samples 910 on the time domain of 1024-points. The receiving node 400 may perform IFFT on the first RSs 810, and the receiving node 400 may identify the samples 1310 on the time domain of 2048-points.

According to an embodiment, the receiving node 400 may input the first samples 1310 to the input layer 921 of the artificial neural network 920. The receiving node 400 may identify output values output from the artificial neural network 920 upon inputting the first samples 1310.

According to an embodiment, the receiving node 400 may compare values of the first sample 1310 and output values to determine at least one weight of the artificial neural network 920 so that a difference of the comparison is less than or equal to a designated value. For example, the receiving node 400 may compare the values of the first samples 1310 and the output values to determine an input layer weight $W_{in}$, an output layer weight $W_{out}$, and/or a hidden layer weight $W$ so that a difference of the comparison is less than or equal to a designated value.

According to an embodiment, the receiving node 400 may perform compensation of distorted signals (e.g., first signals) by using the artificial neural network 920 based on the determined at least one weight. For example, the receiving node 400 may receive the first signals, and the first signals may be distorted due to nonlinearity of a power amplifier of the transmitting node 430. The receiving node 400 may perform IDFT or IFFT on first data signals of the first signals, and the receiving node 400 may obtain first samples. The receiving node 400 may output the first samples to the artificial neural network 920 based on the determined at least one weight. Upon inputting the first samples, the receiving node 400 may identify compensation values output from the artificial neural network 920.

In an example, the receiving node 400 may perform FFT on the output compensation values, and may obtain second signals. For example, the second signals may correspond to a signal substantially subjected to compensation for distortion of the first signals.

Figure 14A:
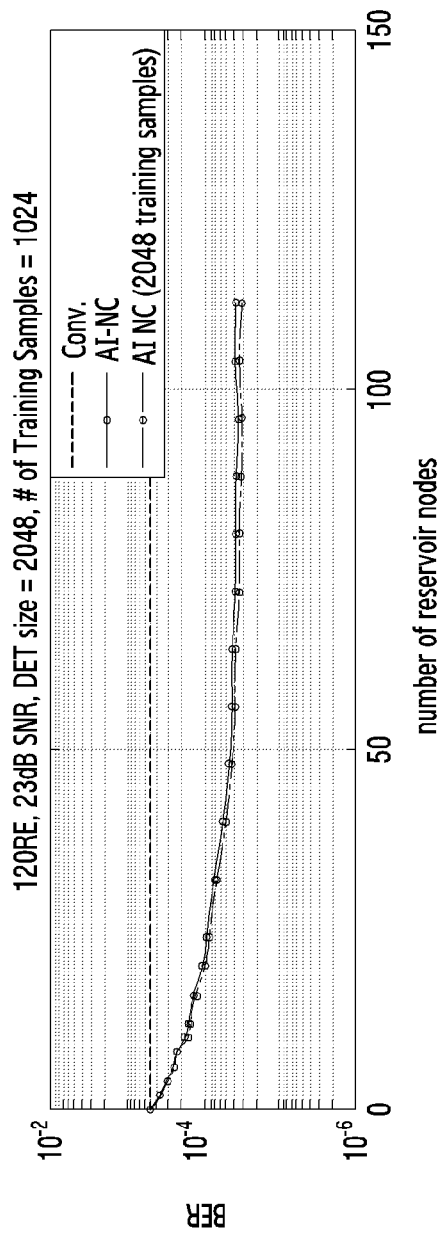
FIG. 14A is a diagram for illustrating a BER depending on a number of nodes in a case where an artificial neural network is trained based on a first scheme and a case where the artificial neural network is trained based on a third scheme according to an embodiment of the disclosure.

FIG. 14A is a diagram for illustrating a BER depending on a number of nodes in a case where an artificial neural network is trained based on a first scheme and a case where the artificial neural network is trained based on a third scheme according to an embodiment of the disclosure.

Referring to FIG. 14A, a first graph 1401 according to an embodiment may be referred to a bit error rate (BER) of a case where artificial intelligence (AI)-non-linearity compensation (NCI) is not utilized. A second graph 1402 may be referred to as a BER depending on the number of nodes of the artificial neural network 920 in a case where the receiving node 400 trains the artificial neural network 920, based on a third scheme in case that an RB size is 1200. A third graph 1403 may be referred to as a BER depending on the number of nodes of the artificial neural network 920 in a case where the receiving node 400 trains the artificial neural network 920, based on the first node, in case that the RB size is 1200.

According to an embodiment, since the first graph 1401 corresponds to a case where the artificial neural network 920 is not utilized, values indicated by the first graph 1401 may not be affected by the number of nodes of the artificial neural network 920. For example, the first graph 1401 may indicate a constant value, such as a constant function. For example, the first graph 1401 may correspond to a reference line or reference function for the second graph 1402 and the third graph 1403.

According to an embodiment, the second graph 1402 and the third graph 1403 indicate substantially the same BER value depending on the number of nodes of the artificial neural network 920. Therefore, even if the receiving node 400 trains the artificial neural network 920, based on the third scheme, substantially the same reliability as the case where the artificial neural network 920 is trained based on the first method may be secured. As a result, since the receiving node 400 trains the artificial neural network 920, based on the third scheme, substantially the same reliability of the artificial neural network 920 as the first scheme may be secured while reducing consumption of a computing resource and time.

Figure 14B:
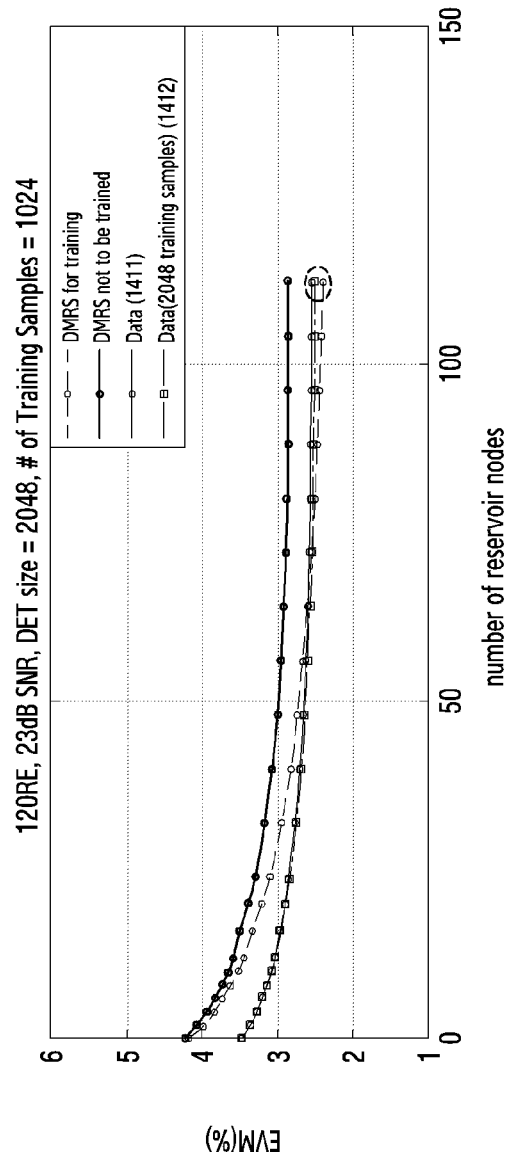
FIG. 14B is a diagram for illustrating an EVM depending on a number of nodes in a case where an artificial neural network is trained based on a first scheme and a case where the artificial neural network is trained based on a third scheme according to an embodiment of the disclosure.

FIG. 14B is a diagram for illustrating an EVM depending on a number of nodes in a case where an artificial neural network is trained based on a first scheme and a case where the artificial neural network is trained based on a third scheme according to an embodiment of the disclosure.

Referring to FIG. 14B, a first graph 1411 according to an embodiment may be referred to as an EVM depending on the number of nodes of the artificial neural network 920 in a case where the artificial neural network 920 is trained based on a third scheme in case that an RB size is 1200. A second graph 1412 may be referred to as an EVM depending on the number of nodes of the artificial neural network 920 in a case where the receiving node 400 trains the artificial neural network 920, based on a first scheme, in case that the RB size is 1200.

According to an embodiment, the first graph 1412 and the second graph 1412 indicate substantially the same EVM value depending on the number of nodes of the artificial neural network 920. Therefore, even if the receiving node 400 trains the artificial neural network 920, based on the third scheme, substantially the same reliability as the case where the artificial neural network 920 is trained based on the first method may be secured. As a result, since the receiving node 400 trains the artificial neural network 920, based on the third scheme, substantially the same reliability of the artificial neural network 920 as the first scheme may be secured while reducing consumption of a computing resource and time.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the disclosure.

According to an embodiment, a method performed by a receiving node in a wireless communication system may include receiving first signals from a transmitting node, identifying compensation values in which distortion of the first signals is compensated on a time domain by using an artificial neural network trained by a designated scheme, and obtaining second signals of which the distortion is compensated based on the identified compensation values. The designated scheme may be determined by a size of a first resource block (RB) assigned to receive the first signals from the transmitting node.

According to an embodiment, the designated scheme for training the artificial neural network may include a first scheme using a first reference signal (RS) received in the first RB in case that the size of the first RB is included in a first section. The designated scheme may include a second scheme using the first RSs and second RSs received in the first RB in case that the size of the first RB is included in a second section lower than the first section. The designated scheme may include a third scheme using some of the first RSs received in the first RB in case that the size of the first RB is included in a third section higher than the first section.

According to an embodiment, the training of the artificial neural network by the second scheme may further include training the artificial neural network by using third RSs received in a second RB received before the first RB.

According to an embodiment, first resource elements (REs) of the first RB corresponding to the first RSs may be received in the same symbol. Second REs of the first RB corresponding to the second RSs may be received in the same symbol.

According to an embodiment, in case that the size of the first RB is included in a fourth section lower than the second section, the artificial neural network may not be trained by using the first RSs received in the first RB.

According to an embodiment, the method may further include receiving, from the transmitting node, information on the size of the first RB, and transmitting, to the transmitting node, information on parameters related to the artificial neural network trained by the designated scheme determined based on the size of the first RB. The information on the parameters related to the artificial neural network may include information on a first threshold corresponding to a boundary of the first section and the second section and a second threshold corresponding to a boundary of the first section and the third section.

According to an embodiment, the method may further include transmitting, to the transmitting node, information for requesting a change of the size of the first RB, based on the information on the size of the first RB.

According to an embodiment, the training of the artificial neural network by the third scheme may include converting the first RBs to samples on the time domain through inverse fast Fourier transform (IFFT), and training the artificial neural network by using samples before a designated time among the samples on the time domain.

According to an embodiment, a first threshold corresponding to a boundary of the first section and the second section and a second threshold corresponding to a boundary of the second section and the third section may be determined based on a type of a power amplifier of the transmitting node and/or the number of nodes included in the artificial neural network.

According to an embodiment, the signals may be received on a physical downlink shared channel (PDSCH). The first RSs and the second RSs may include a demodulation reference signal (DMRS) on the PDSCH.

According to an embodiment, the artificial neural network may include first nodes included in an input layer, second nodes included in an output layer, and third nodes included in a hidden layer connecting the input layer and the output layer.

According to an embodiment, the method may further include training the artificial neural network, based on the designated scheme. The training of the artificial neural network, based on the designated scheme, may include inputting values of samples on the time domain corresponding to RSs identified by the designated scheme to the input layer of the artificial neural network, comparing values output from the output layer of the artificial neural network and pre-stored values, and adjusting a weight of the output layer such that a difference between the output values and the pre-stored value is less than or equal to a designated value. The samples on the time domain may be obtained by performing inverse fast Fourier transform (IFFT) on the identified RSs. The pre-stored values may correspond to the identified RSs.

According to an embodiment, the method may further include converting a data signal received in the first RB to a first sample on the time domain, inputting the first sample to the artificial neural network including the output layer of which the weight is adjusted, identifying a first compensation value in which distortion of the data signal received in the first RB is compensated, based on a value output form the output layer of the artificial neural network, and identifying a signal in which the distortion of the data signal is compensated, based on the identified first compensation value.

According to an embodiment, in the method, the obtaining of the second signals of which the distortion is compensated based on the compensation values may include performing fast Fourier transform (FFT) on the compensation values.

According to an embodiment, a receiving node in a wireless communication system may include a transceiver, and a controller coupled with the transceiver. The controller may be configured to receive first signals from a transmitting node, identify compensation values in which distortion of the first signals is compensated on a time domain by using an artificial neural network trained by a designated scheme, and obtain second signals of which the distortion is compensated based on the identified compensation values. The designated scheme may be determined by a size of a first resource block (RB) assigned to receive the first signals from the transmitting node.

According to an embodiment, the designated scheme for training the artificial neural network may include a first scheme using a first reference signal (RS) received in the first RB in case that the size of the first RB is included in a first section, a second scheme using the first RSs and second RSs received in the first RB in case that the size of the first RB is included in a second section lower than the first section, and a third scheme using some of the first RSs received in the first RB in case that the size of the first RB is included in a third section higher than the first section.

According to an embodiment, in case that the size of the first RB is included in a second section lower than the first section, the controller may be configured to train the artificial neural network by using third RSs received in a second RB received before the first RB.

According to an embodiment, first resource elements (REs) of the first RB corresponding to the first RSs may be received in the same symbol. Second REs of the first RB corresponding to the second RSs may be received in the same symbol.

According to an embodiment, in case that the size of the first RB is included in a fourth section lower than the second section, the artificial neural network may not be trained by using the first RSs received in the first RB.

According to an embodiment, the controller may be configured to receive, from the transmitting node, information on the size of the first RB, and transmit, to the transmitting node, information on parameters related to the artificial neural network trained by the designated scheme determined based on the size of the first RB.

According to an embodiment, the information on the parameters related to the artificial neural network may include information on a first threshold corresponding to a boundary of the first section and the second section and a second threshold corresponding to a boundary of the first section and the third section.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a receiving node in a wireless communication system, the method comprising:
receiving, from a transmitting node, first signals;
identifying a size of a first resource block (RB) assigned to receive the first signals;
identifying a scheme for training an artificial neural network, based on the size of the first RB;
identifying compensation values for compensating distortion of the first signals in a time domain, based on the artificial neural network trained by the scheme; and
obtaining second signals by applying the compensation values to the first signals,
wherein, in case that the size belongs to a first range, the scheme is identified as a first scheme in which first reference signals (RSs) corresponding to a first symbol among the first signals are used for a training, and wherein, in case that the size belongs to a second range lower than the first range, the scheme is identified as a second scheme in which the first RSs corresponding to the first symbol and second RSs corresponding to a second symbol are used for the training.

2. The method of claim 1,
wherein, in case that the size is equal to or greater than a first threshold and less than a second threshold, the scheme is identified as the first scheme,
wherein, in case that the size is less than the first threshold, the scheme is identified as the second scheme, and
wherein, in case that the size is equal to or greater than the second threshold, the scheme is identified as a third scheme in which a portion of the first RSs is used for the training.

3. The method of claim 2, wherein, in case that the size of the first RB belongs to a fourth range lower than the second range, the artificial neural network is not trained by using RSs of the first RB.

4. The method of claim 2, further comprising:
receiving, from the transmitting node, information on the size of the first RB; and
transmitting, to the transmitting node, information on parameters associated with the artificial neural network,
wherein the information on the parameters includes information on the first threshold corresponding to a boundary between the first range and the second range and information on the second threshold corresponding to a boundary between the first range and a third range.

5. The method of claim 4, further comprising:
transmitting, to the transmitting node, information for requesting a change of the size of the first RB, based on the information on the size of the first RB.

6. The method of claim 2, wherein the first threshold and the second threshold are determined based on at least one of a type of a power amplifier of the transmitting node or a number of nodes included in the artificial neural network.

7. The method of claim 1,
wherein the second RSs include RSs received on the first RB, or RSs received on a second RB, and
wherein the second RB is before the first RB.

8. The method of claim 1,
wherein first resource elements (REs) of the first RB on which the first RSs are received correspond to the same symbol, and
wherein second REs of the first RB on which the second RSs are received correspond to the same symbol.

9. The method of claim 1, wherein, in case that the scheme is identified as a third scheme, the method further comprises:
converting the first RSs to samples in the time domain through inverse fast Fourier transform (IFFT); and
training the artificial neural network by using first samples before a designated time among the samples in the time domain.

10. The method of claim 1,
wherein the first signals are received on a physical downlink shared channel (PDSCH), and
wherein the first RSs and the second RSs include a demodulation reference signal (DMRS) on the PDSCH.

11. The method of claim 1, wherein the artificial neural network comprises:
first nodes included in an input layer;
second nodes included in an output layer; and
third nodes included in a hidden layer connecting the input layer and the output layer.

12. The method of claim 11, further comprising:
training the artificial neural network, based on the identified scheme,
wherein the training of the artificial neural network, based on the identified scheme, comprises:
inputting values of samples in the time domain corresponding to RSs identified by the identified scheme to the input layer of the artificial neural network,
comparing values output from the output layer of the artificial neural network and pre-stored values, and
adjusting a weight of the output layer such that a difference between the values output from the output layer and the pre-stored values is less than or equal to a designated value,
wherein the samples in the time domain are obtained by performing inverse fast Fourier transform (IFFT) on the identified RSs, and
wherein the pre-stored values correspond to the identified RSs.

13. The method of claim 12, further comprising:
converting a data signal received on the first RB to a first sample in the time domain;
inputting the first sample to the artificial neural network including the output layer of which the weight is adjusted;
identifying a first compensation value for compensating distortion of the data signal, based on a value output from the output layer of the artificial neural network; and
identifying a signal by applying the first compensation value to the data signal.

14. The method of claim 1, wherein the obtaining of the second signals comprises performing fast Fourier transform (FFT) on the compensation values.

15. A receiving node in a wireless communication system, the receiving node comprising:
a transceiver; and
a controller coupled with the transceiver,
wherein the controller is configured to:
receive, from a transmitting node, first signals,
identify a size of a first resource block (RB) assigned to receive the first signals,
identify a scheme for training an artificial neural network, based on the size of the first RB,
identify compensation values for compensating distortion of the first signals in a time domain, based on an artificial neural network trained by the scheme, and
obtain second signals by applying the compensation values to the first signals,
wherein, in case that the size belongs to a first range, the scheme is identified as a first scheme in which first reference signals (RSs) corresponding to a first symbol among the first signals are used for a training, and
wherein, in case that the size belongs to a second range lower than the first range, the scheme is identified as a second scheme in which the first RSs corresponding to the first symbol and second RSs corresponding to a second symbol are used for the training.

16. The receiving node of claim 15,
wherein, in case that the size is equal to or greater than a first threshold and less than a second threshold, the scheme is identified as the first scheme,
wherein, in case that the size is less than the first threshold, the scheme is identified as the second scheme, and wherein, in case that the size is equal to or greater than the second threshold, the scheme is identified as a third scheme in which a portion of the first RSs is used for the training.

17. The receiving node of claim 16, wherein, in case that the size of the first RB belongs to a fourth range lower than the second range, the artificial neural network is not trained by using RSs of the first RB.

18. The receiving node of claim 16,
wherein the controller is configured to:
    receive, from the transmitting node, information on the size of the first RB, and
    transmit, to the transmitting node, information on parameters associated with the artificial neural network, and
wherein the information on the parameters related includes information on the first threshold corresponding to a boundary between the first range and the second range and information on the second threshold corresponding to a boundary between the first range and a third range.

19. The receiving node of claim 15,
wherein the second RSs include RSs received on the first RB, or RSs received on a second RB, and
wherein the second RB is before the first RB.

20. The receiving node of claim 15,
wherein first resource elements (REs) of the first RB on which the first RSs are received correspond to the same symbol, and
wherein second REs of the first RB on which the second RSs are received correspond to the same symbol.

* * * * *